United States Patent [19]

Ito

[11] Patent Number: 4,978,204
[45] Date of Patent: Dec. 18, 1990

[54] HIGH ZOOM-RATIO ZOOM LENS SYSTEM FOR USE IN A COMPACT CAMERA

[75] Inventor: Takayuki Ito, Tokyo, Japan

[73] Assignee: Asahi Kogaku Kogyo Kabushik Kaisha, Tokyo, Japan

[21] Appl. No.: 404,399

[22] Filed: Sep. 7, 1989

[30] Foreign Application Priority Data

Sep. 8, 1988 [JP] Japan .................. 63-225294
Dec. 27, 1988 [JP] Japan .................. 63-330469
May 23, 1989 [JP] Japan .................. 1-129556

[51] Int. Cl.$^5$ .................. G02B 15/14; G02B 9/64
[52] U.S. Cl. .................. 350/423; 350/427
[58] Field of Search .................. 350/423, 426, 427

[56] References Cited

U.S. PATENT DOCUMENTS 4,840,467  6/1989  Takada et al. .................. 350/427
4,906,077  3/1990  Ito .................. 350/423

FOREIGN PATENT DOCUMENTS 56128911 10/1981 Japan .
57201213  9/1982 Japan .
58184916 10/1983 Japan .
 6048009  3/1985 Japan .
 6057814  4/1985 Japan .
60170816  9/1985 Japan .
60191216  9/1985 Japan .
 6278522  4/1987 Japan .
 6290611  4/1987 Japan .
62113120  5/1987 Japan .
62264019 11/1987 Japan .
 6343115  2/1988 Japan .
63153511  6/1988 Japan .
63155113  6/1988 Japan .
63157120  6/1988 Japan .
63159818  7/1988 Japan .
63161423  7/1988 Japan .
 6457222  3/1989 Japan .

Primary Examiner—Bruce Y. Arnold
Assistant Examiner—Rebecca D. Gass
Attorney, Agent, or Firm—Sughrue, Mion, Zinn, MacPeak & Seas

[57] ABSTRACT

A high zoom ratio zoom lens for a compact camera is disclosed which comprises in order from the object side, a first lens group having a positive focal length, a second lens group having a positive focal length, and a third lens group having a negative focal length. When zooming is carried out from a wide angle side to a telephoto side, the first, second and third lens group are all moved toward the object side so that a distance between the first and second lens groups is increased and a distance between the second and third lens groups is decreased. The zoom lens satisfying the following conditions:

(A) the second lens group being composed, in order from the object side, of a sub-component 2a having a negative focal length and a sub-component 2b having a positive focal length,
(B) a stop diaphragm being disposed between the first and second lens groups and being moved in unison with said second lens group during zooming, and
(C) the stop diaphragm being separatable from the second lens group and being positionally fixed during focusing.

24 Claims, 22 Drawing Sheets

| SPHERICAL ABERRATION SINE CONDITION | CHROMATIC ABERRATION | ASTIGMATISM | DISTORTION |

HIGH ZOOM-RATIO ZOOM LENS SYSTEM FOR USE IN A COMPACT CAMERA

BACKGROUND OF THE INVENTION

The present invention relates to a zoom lens suitable for a compact camera, in which there is less restriction to a backfocus, and more particularly to a zoom lens that is compact but has a high zoom ratio.

The following five types of zoom lens systems have conventionally been used in compact cameras:

(I) A two-group system of the telephoto type composed of a first lens group having a positive focal length and a second lens group having a negative focal length and including a diaphragm stop. Such lens systems are disclosed in Unexamined Published Japanese patent application Nos. 56-128911, 57-201213, 60-48009, 60-170816, 60-191216, 62-90611, 62-264019, 62-113120 and 63-155113. Also, the present applicant proposes such a two-group system in Japanese application Nos. 62-214709, 63-19092 and U.S. patent application Ser. No. 328,265 filed on Mar. 24, 1989.

(II) A three-group system that is a modification of the two-group system (I) and which is composed of a first lens group (master lens) having a positive focal length, a second lens group having a positive focal length, and a third lens group having a negative focal length and including a diaphragm stop. Such a lens system is disclosed in Unexamined Published Japanese patent application No. 58-184916.

(III) A four-group system composed of a first lens group having a positive foal length, a second lens group having a negative focal length, a stop diaphragm after the second lens group, a third lens group having a positive focal length and a fourth lens group having a negative focal length. Such a lens system is disclosed in Japanese Unexamined patent application No. 60-57814.

(IV) A three-group system which is a modification of the four-group system (III) in which the system is composed of a first lens group having a positive focal length, a second lens group having a positive focal length and a third lens group having a positive focal length. The second lens group includes a stop diaphragm and is composed, in order from the object side, a negative sublens group 2a and a positive sub-lens group 2b. During zooming, the sub-lens groups 2a and 2b are moved in unison with each other. See Japanese Unexamined Patent Publication No. 62-78522 hereinafter referred to as system (IV).

(V) A high zoom ratio four-group or three-group system which has the same arrangement of lens components and a stop diaphragm as that of the systems (III) or (IV) but has a zoom ratio of about 2.1 to 2.8 times (the zoom ratio of the systems (III) and (IV) is about 1.6 times). Such a system is disclosed in, for example, Japanese Unexamined Patent Publications Nos. 63-43115, 63-153511, 63-157120, 63-159818 and 63-161423 which will be hereinafter referred to as system (V).

The above-described conventional zoom lens systems, however, have certain problems as discussed below.

In systems (I) and (II), the zoom ratio is smaller than 2. If the larger zoom ratio is obtained by the concept of the systems (I) and (II), the movement of each lens group would be abruptly increased. It is thus impossible to make the systems small in size due to their structural limitation.

The systems (III) and (IV) are small in amount of movement. However, the zoom ratio thereof is smaller than 2. If the zoom ratio is increased under the concept of the systems, a diameter of the front lens element and the overall length of the systems are abruptly increased, resulting in enlargement of the lens systems. This is undesirable for a compact camera.

The three- or four-group system (V) is characterized in that the zoom ratio exceeds 2. However, the four-group system is complicated in structure so that respective four groups are moved independently of each other. In addition, in this system, a stop diaphragm is interposed between the second and third lens groups that are largely affected by manufacture errors. It is therefore difficult to ensure manufacture precision of the second and third lens groups that are very sensitive. On the other hand, in the three-group system, since the stop diaphragm is disposed in the second lens group, it is difficult to enhance the precision of the sub-lens groups 2a and 2b. Thus, this system also suffers from a disadvantage that it is difficult to manufacture the system. Also, either of the three-and four-group systems is not compact in size.

SUMMARY OF THE INVENTION

According to the present invention, there is provided a high zoom ratio zoom lens for a compact camera, comprising, in order from the object side, a first lens group having a positive focal length, a second lens group having a positive focal length, and a third lens group having a negative focal length, wherein, when zooming is carried out from a wide angle side to a telephoto side, the first, second and third lens groups are all moved toward the object side so that a distance between the first and second lens groups is increased and a distance between the second and third lens groups is decreased, the zoom lens satisfying the following conditions:

(A) the second lens group being composed, in order from the object side, of a sub-component 2a having a negative focal length and a sub-component 2b having a positive focal length, (B) a stop diaphragm being disposed between the second and third lens groups and being moved in unison with the second lens group during zooming, and (C) the stop diaphragm being separatable from the second lens group and being positionally fixed during focusing.

The zoom lens according to the invention, further satisfies the conditions:

$$2.5 < \frac{f_T}{f_{1-2T}} < 4.0 \qquad (1)$$

$$1.2 < f_T/f_1 < 2.3 \qquad (2)$$

$$0.43 < x_{2a}/x_1 < 0.9 \qquad (3)$$

$$0.3 < l_{2-A}/f_W < 0.8 \qquad (4)$$

where $f_T$ is the focal length of the overall zoom lens at the telephoto side;

$f_{1-2T}$ is the composite focal length of the first and second lens groups at the telephoto side;

$f_1$ is the focal length of the first lens groups;

$(f_T)/(f_{1-2T}) = m_3$ is the lateral magnification of the third lens group at the telephoto side;

$f_T/f_1 = m_{2,3}$ is the composite lateral magnification of the second and third lens groups at the telephoto side;

$x_1$ is the amount of movement of the first lens group during zooming;

$x_{2a}$ is the amount of movement of the sub-component 2a during zooming;

$f_W$ is the focal length of the overall zoom lens at the wide angle side; and $l_{2-A}$ is the distance form a front most end of the second lens group to the stop diaphragm.

The zoom lens according to the invention further satisfies the conditions:

$$3.0 < \left(\frac{f_T}{f_{1-2T}}\right)^2 - \left(\frac{f_T}{f_1}\right)^2 < 14.0 \quad (5)$$

$$0.1 < \frac{x_3}{(f_T - f_W)Z} < 0.4 \quad (6)$$

where $x_3$ is the amount of movement of the third lens group during zooming; and $Z$ is the zoom ratio.

In the zoom lens according to the invention, the first lens group is composed, in order from the object side, of a biconcave lens, a biconvex lens and a positive lens whose convex surface is directed toward the object. The biconcave lens and said biconvex lens of the first lens group may be bonded together. The sub-component 2a is composed, in order from the object side, a biconcave lens and a positive lens that are bonded together with a bonded convex surface being directed to the object. The zoom lens satisfies the condition:

$$0.5 < \frac{f_2}{-f_{2a}} < 1.0 \quad (7)$$

where $f_{2a}$ is the focal length of the sub-component 2a; and $f_2$ is the focal length of the second lens group at the wide angle side.

The sub-component 2b is composed, in order from the object side, of a bonded lens of a positive lens and a negative meniscus lens with a bonded concave surface being directed to the object, and a positive lens. The third lens group is composed, in order from the object side, of a positive lens having a larger curvature surface convex toward the image, and two negative lenses each having a concave surface toward the object.

In the zoom lens according to the invention, when zooming is carried out from the wide angle side to the telephoto side, the sub-components 2a and 2b may be moved independently of each other toward the object while decreasing a distance between the sub-components 2a and 2b.

(a) During focusing, the first lens group, the stop diaphragm and the third lens groups are fixed, and only the second lens group is moved toward the object.

(a') In this case, the distance between the sub-components 2a and 2b is increased and the sub-components are moved independently of each other toward the object.

(b) Alternatively, according to the invention, during focusing, the first lens group, the second lens group and the stop diaphragm are fixed, and only the third lens group is moved toward the image.

According to the present invention, in summing up, in order to simplify the zooming and focusing mechanisms, each lens block of the first, second and third lens groups is separated from a shutter mechanism including the stop diaphragm. The stop diaphragm is arranged between the second and third lens groups.

With such an arrangement, not only the zooming mechanism is simplified, but also the shutter mechanism may be fixed when the focusing only using the second or third lens groups as explained in the above-paragraphs (a) and (b) (The first lens is not used for focusing because the first lens group has a relatively small power so that there would be a problem in marginal light quantity at the minimum object distance during focusing). Thus, the automatically focusing mechanism therefor may be simple. Since the moving mechanism just carries the lens blocks, the weight of the moved parts may be reduced, to thereby readily enhance the speed of autofocusing.

In order to realize a further compactness, according to another aspect of the invention, there is provided a high zoom ratio zoom lens for a compact camera, comprising, in order from the object side, a first lens group having a positive focal length, a second lens group having a positive focal length, and third lens group having a negative focal length, wherein, when zooming is carried out from a wide angle side to a telephoto side, the first, second and third lens groups are all moved toward the object side so that a distance between the first and second lens groups is increased and a distance between the second and third lens groups is decreased, the zoom lens satisfying the following conditions:

(A) said second lens group being composed, in order from the object side, of a sub-component 2a having a negative focal length and a sub-component 2b having a positive focal length, (B) a stop diaphragm being moved in unison with said second lens group during zooming, (C) said first lens group and said third lens group being moved in unison with each other during zooming and (D) positive/negative signs of focusing sensitivities of said first and third lens groups that are moved together being opposite to each other, where the focusing sensitivity is an amount of movement of focus in an optical axis direction relative to an error of movement of each lens group.

In the zoom lens, the stop diaphragm is interposed between the second lens group and the third lens group and is moved in unison with the second lens group during zooming.

After relatively, the stop diaphragm may be interposed between the sub-components 2a and 2b and is moved in unison with the second lens group during zooming.

(a) During focusing, the first lens group, the stop diaphragm and the third lens groups are fixed, and only the second lens group is moved toward the object.

(b) During focusing, the stop diaphragm and the second lens group are moved in unison with each other toward the object.

(c) During focusing, the first lens group, the second lens group and the stop diaphragm are fixed, and only the third lens group is moved toward the image.

The zoom lens preferably satisfies the following conditions:

$$-0.5 < \frac{(m_2 m_3)^2}{(1 - m_3^2)} < 0 \quad (8)$$

$$-10.0 < (m_2 m_3)^2 + (1 - m_3^2) < -3.0 \quad (9)$$

where
$m_2$ is the lateral magnification of the second lens group at the telephoto side,
$m_3$ is the lateral magnification of the third lens group at the telephoto side,
$(m_2 m_3)^2$ is the focusing sensitivity of the first lens group at the telephoto side, and
$(1-m_3^2)$ is the focusing sensitivity of the third lens group at the telephoto side.

According to this aspect of the invention, although a three-group type arrangement is applied to a zoom lens having a high zoom ratio for a compact camera as in the prior art, the first lens group and the third lens group are made in unison with each other, thereby reducing or maintaining the number of cams of the prior art two-group type arrangement. Thus, the compactness of the system may be attained, and the cams may readily be provided in a small space. In addition, if the number of cams is reduced, a cam space for a single cam may be enlarged to increase the mechanical precision.

Incidentally, if the mechanism allows, it is obvious for those skilled in the art to move the sub-components $2a$ and $2b$. It is apparent that this modification is within the scope of the concept of the invention.

Also, by moving the first and third lens groups together, there is an another advantage that the focus movement (focusing sensitivity) due to the movement error of the respective groups in the axial direction.

More specifically, assuming that the movement errors of the first, second and third lens groups be $\Delta_1$, $\Delta_2$, and $\Delta_3$, respectively, the focus movement amounts $\Delta P_1$, $\Delta P_2$, and $\Delta P_3$ at the telephoto end relative to the movement errors $\Delta_1$, $\Delta_2$, and $\Delta_3$ of the respective lens groups at the infinite object distance are as follows:

$$\Delta P_1 = (m_2 m_3)^2 \Delta_1$$

$$\Delta P_2 = \{m_3^2 - (m_2 m_3)^2\} \Delta_2$$

$$\Delta P_3 = \{1 - m_3^2\} \Delta_3$$

where $m_2$ and $m_3$ are the lateral magnifications of the second and third lens groups at the telephoto end.

Accordingly, if the first and third lens groups are made in unison with each other, the relation, $\Delta_1 = \Delta_3$ should be met by suitable designs. As a result, the following relation is given:

$$\Delta P_1 + \Delta P_3 = \{1 + (m_2 m_3)^2 - m_3^2\} \Delta_1$$

According to the present invention, since the system is composed of a positive, a positive and a negative lens group, and $0 < m_2 < 1 < m_2 m_3$ is established, $\Delta P_3$ is largest and at about $-10\Delta_3$. $\Delta P_1$ is about $+2$ to $3\Delta_1$. Therefore, if the first and third groups are made in unison with each other, it is possible to decrease the focus sensitivity by about 20 to 30%. Alternatively, by increasing $m_3$ by about 10 to 15% (while keeping the same focusing sensitivity), it is possible to miniaturize the overall system.

DESCRIPTION OF THE CONDITIONS

Figure 1:
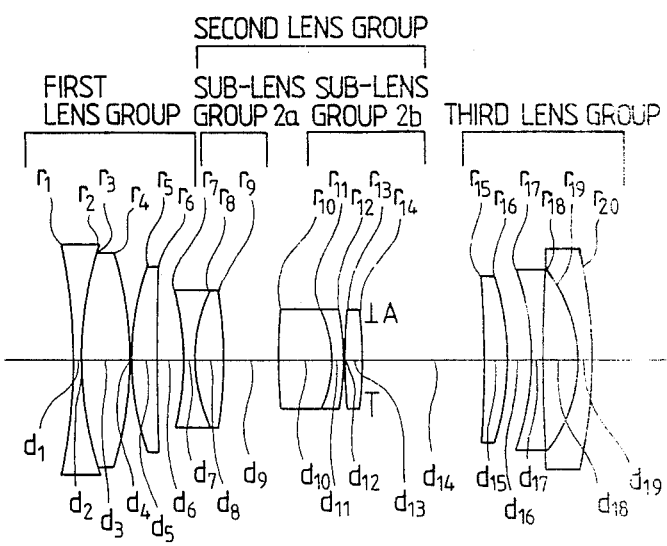
FIGS. 1, 3 and 5 show a lens system at a wide angle side according to Example 1 of the invention, FIG. 1 showing the lens system at the infinite object distance of 1.3 m by focusing with the second lens group, and FIG. 5 showing the lens system at the object distance of 1.3 m by focusing with the third lens group.
Figure 2A:
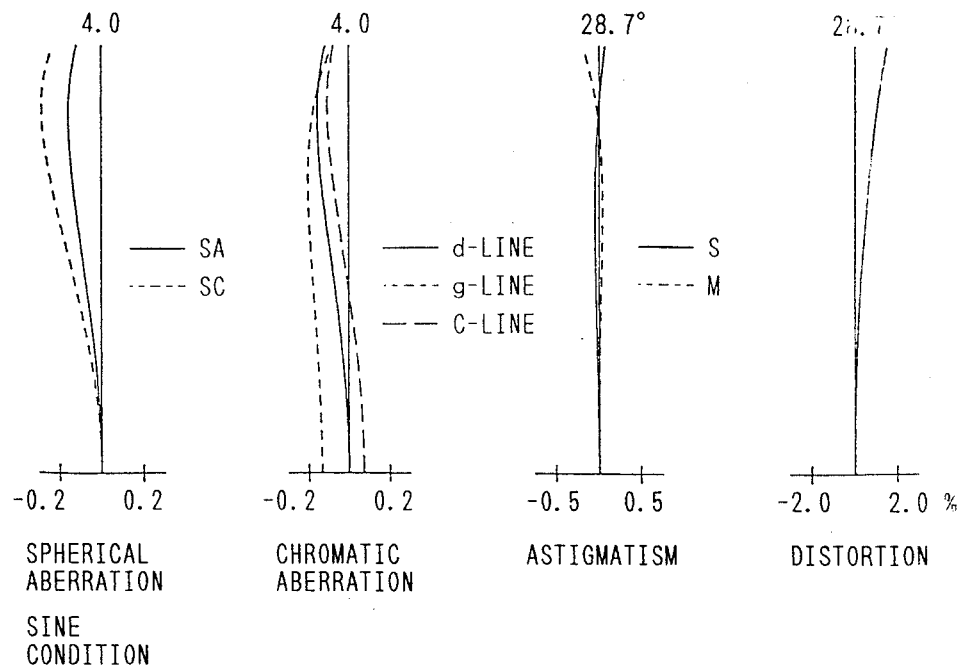
FIGS. 2, 4 and 6 show aberration curves of Example 1 at the infinite distance, the object distance of 1.3 m by focusing with the second lens group, and the object distance of 1.3 m by focusing with the third lens group, respectively, (a), (b) and (c) denoting the conditions at the wide angle side, the intermediate focal length and the telephoto side, respectively.
Figure 2B:
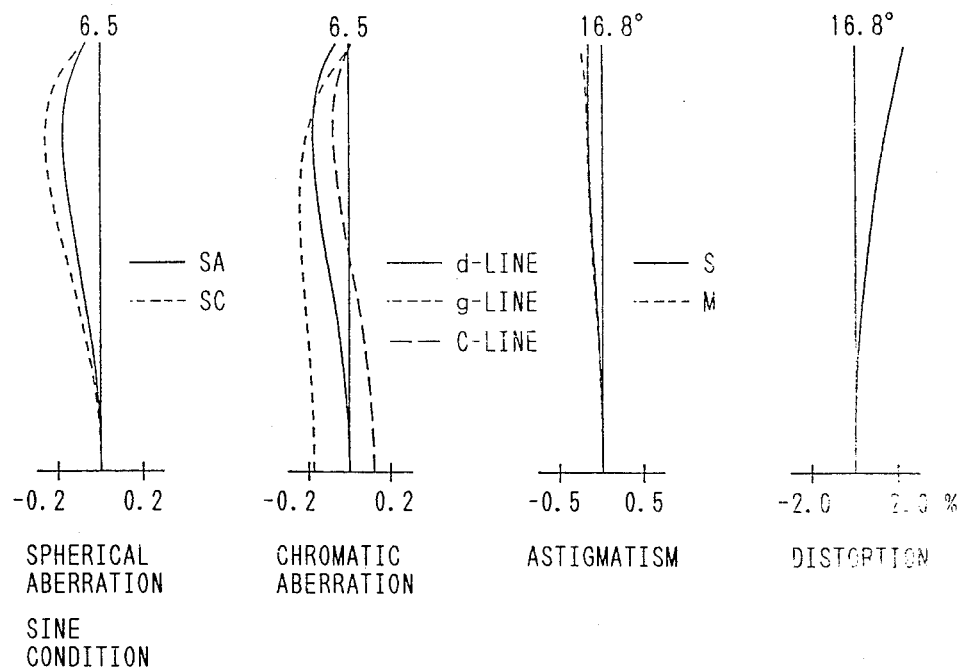
Figure 2C:
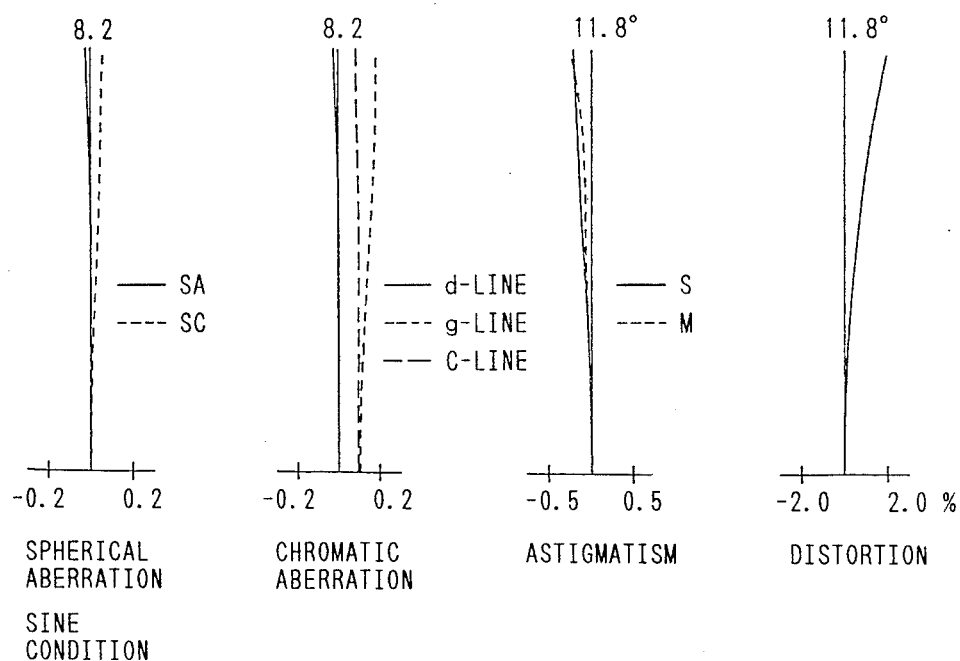
Figure 3:
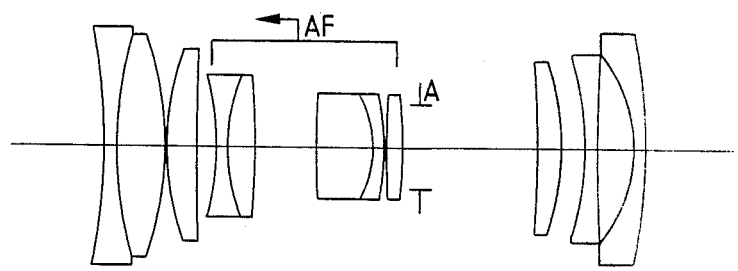
Figure 4A:
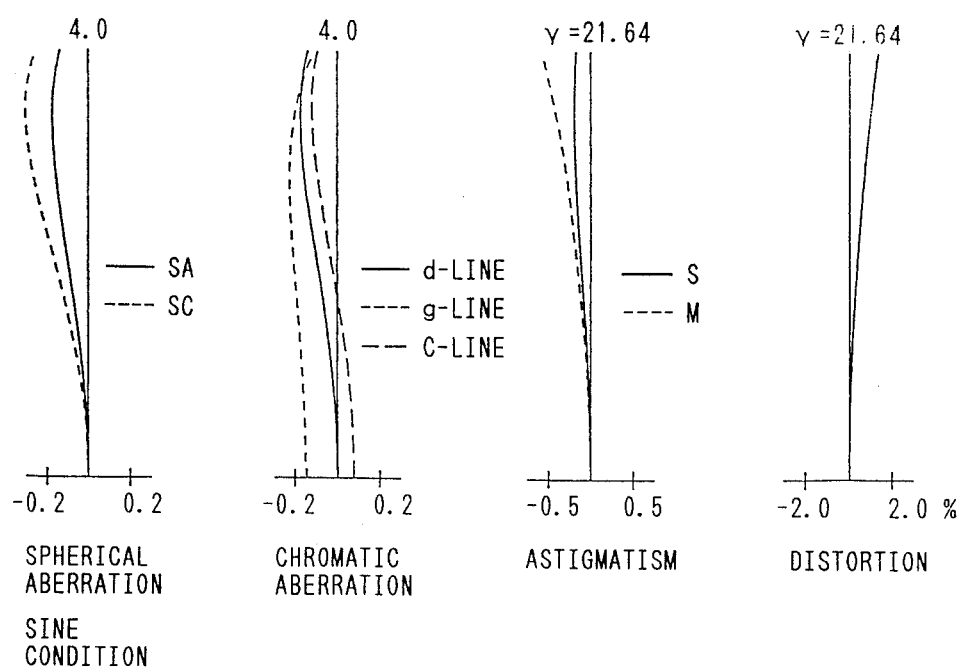
Figure 4B:
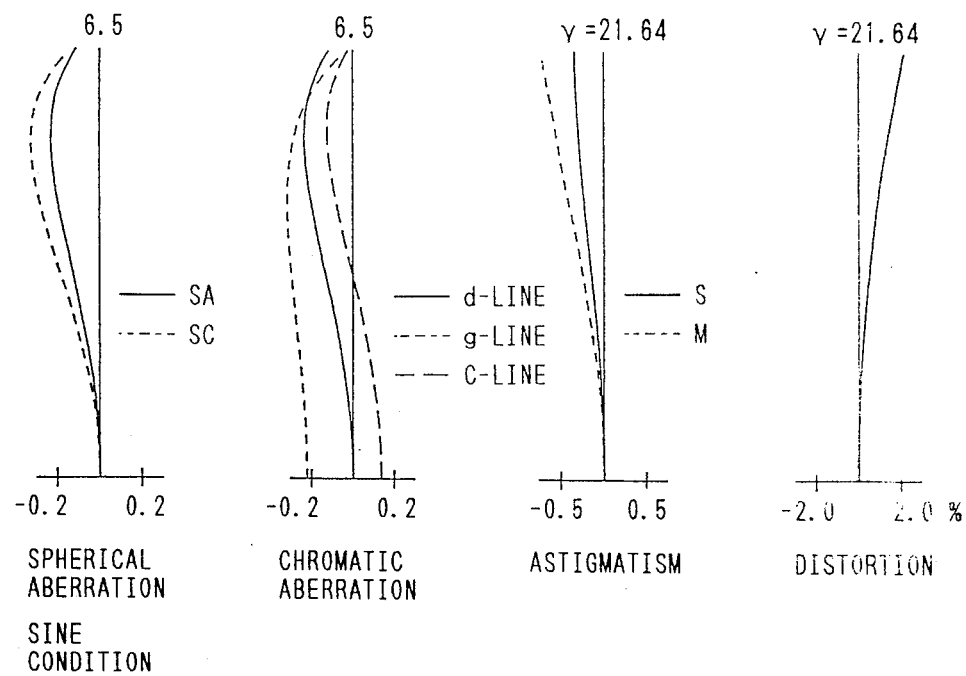
Figure 4C:
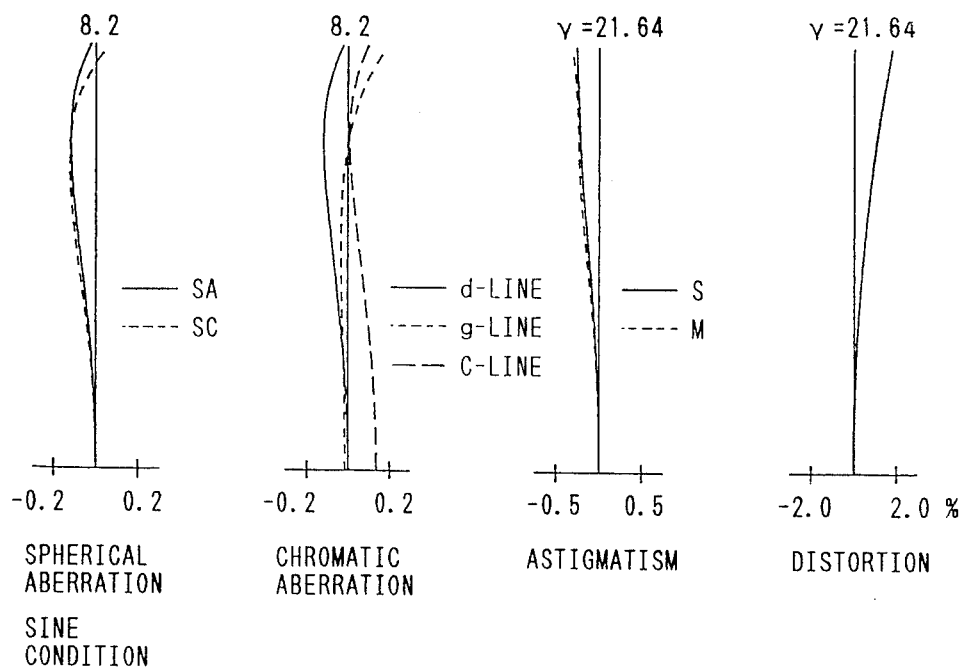
Figure 5:
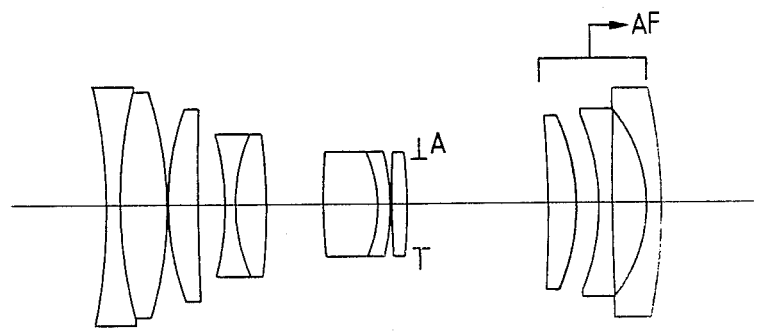
Figure 6A:
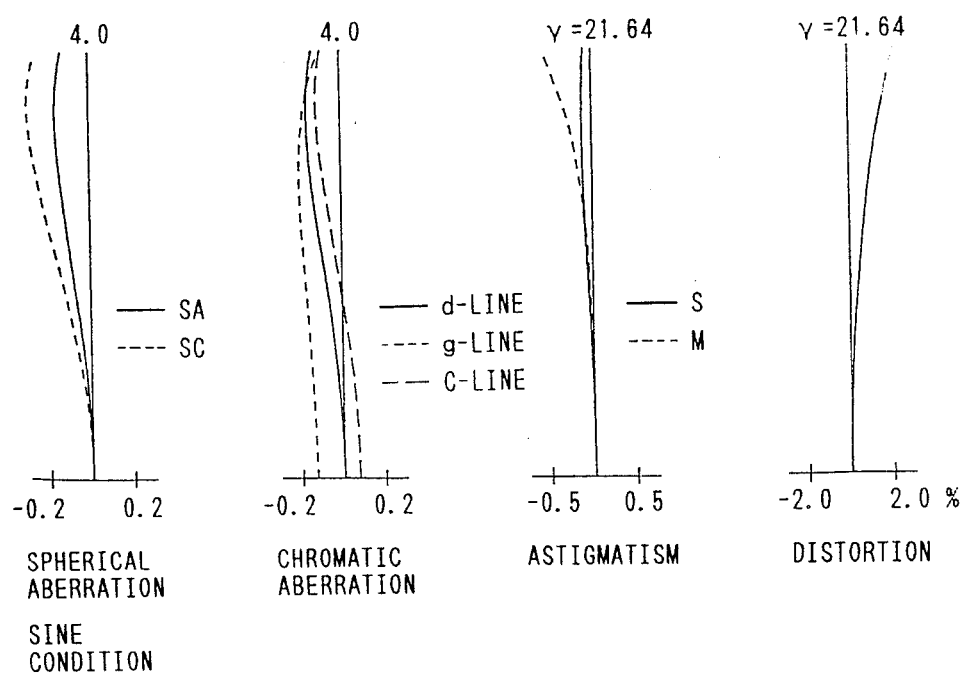
Figure 6B:
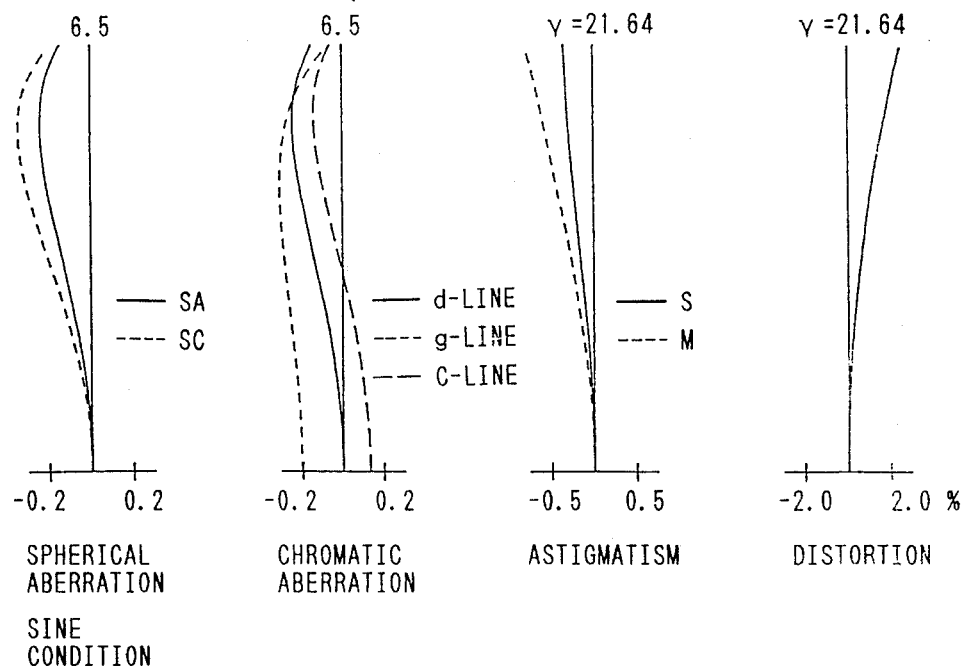
Figure 6C:
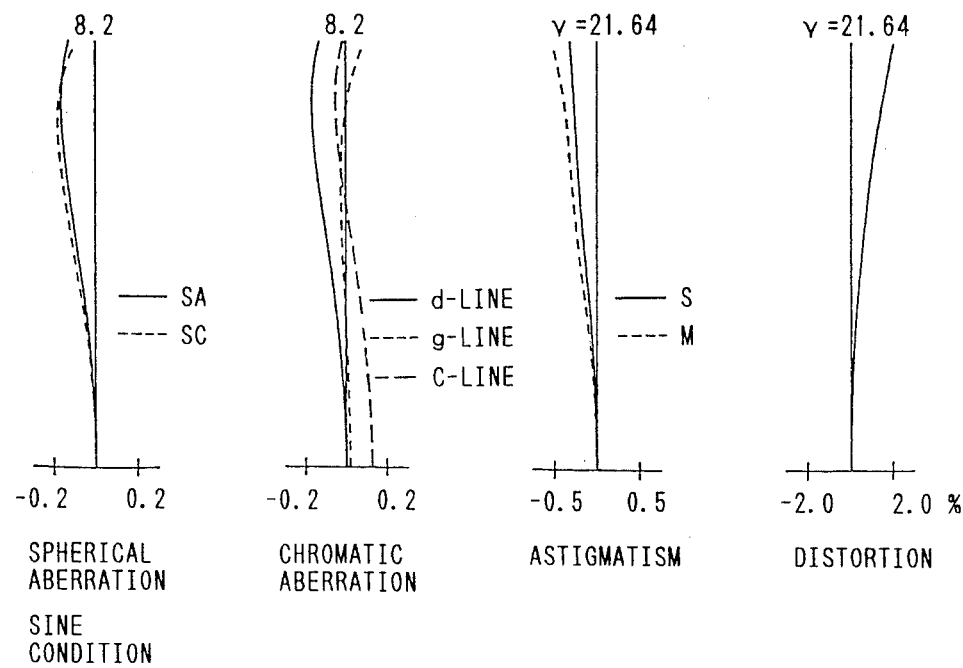
Figure 7:
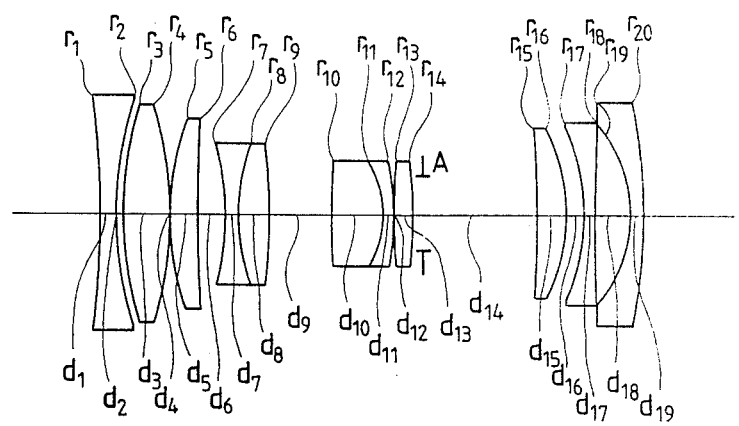
FIGS. 7, 9 and 11 show a lens system at a wide angle side according to Example 2 of the invention, FIG. 7 showing the lens system at the infinite object distance, FIG. 9 showing the lens system at the object distance of 1.3 m focusing with the second lens group, and FIG. 11 showing the lens system at the object distance of 1.3 m by focusing with the third lens group.
Figure 8A:
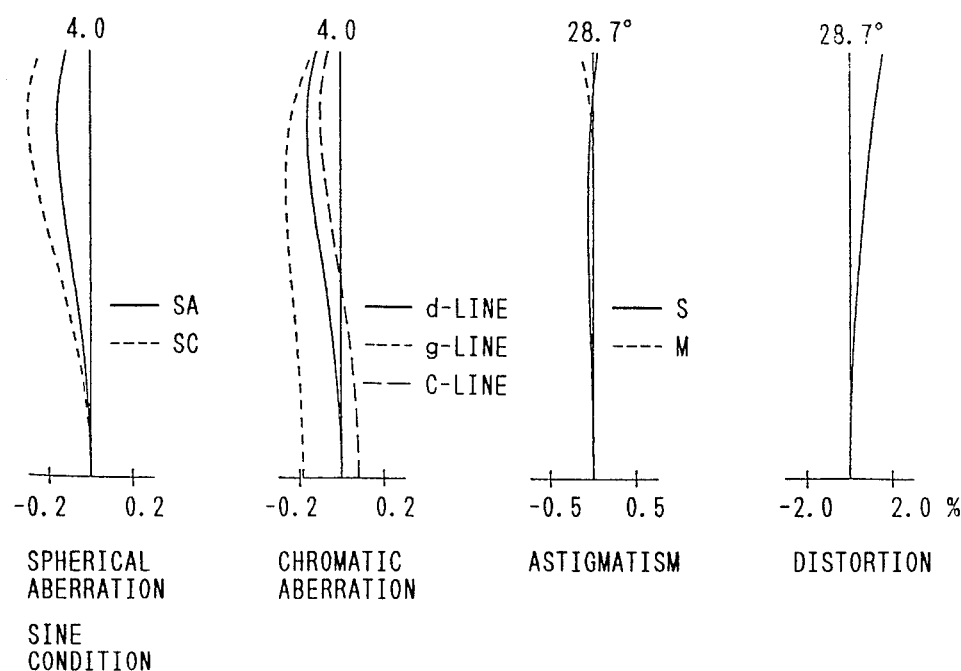
FIGS. 8, 10 and 12 show aberration curves of Example 2 at the infinite distance, the object distance of 1.3 m by focusing wit the second lens group, and the object distance of 1.3 m by focusing with the third lens group, respectively, (a), (b) and (c) denoting the conditions at the wide angle side, the intermediate focal length and the telephoto side, respectively.
Figure 8B:
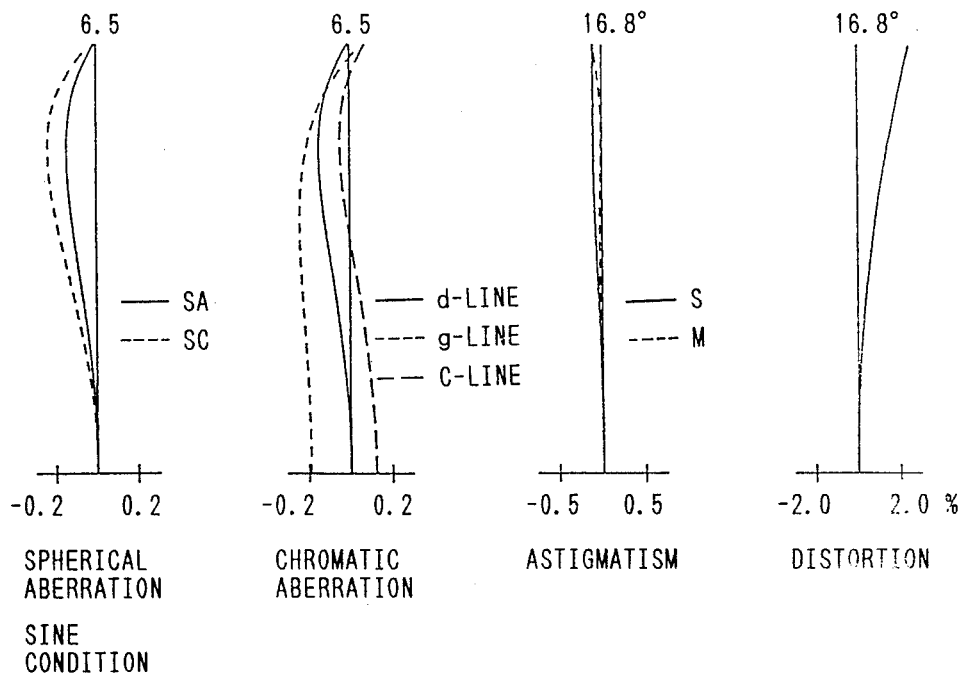
Figure 8C:
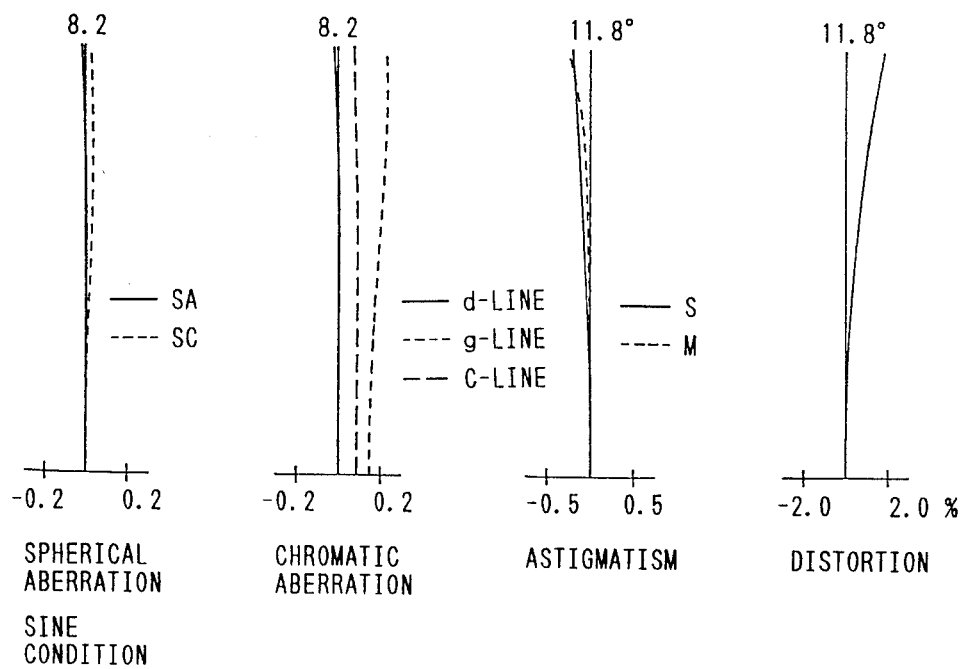
Figure 9:
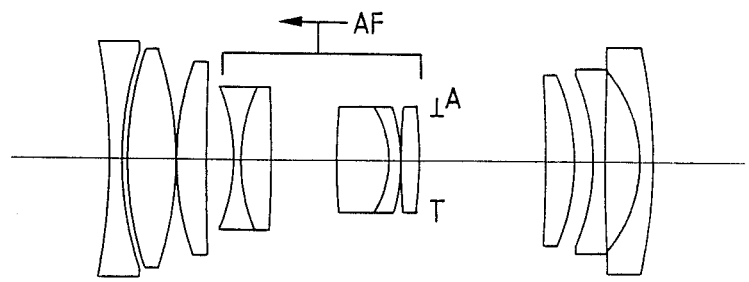
Figure 10A:
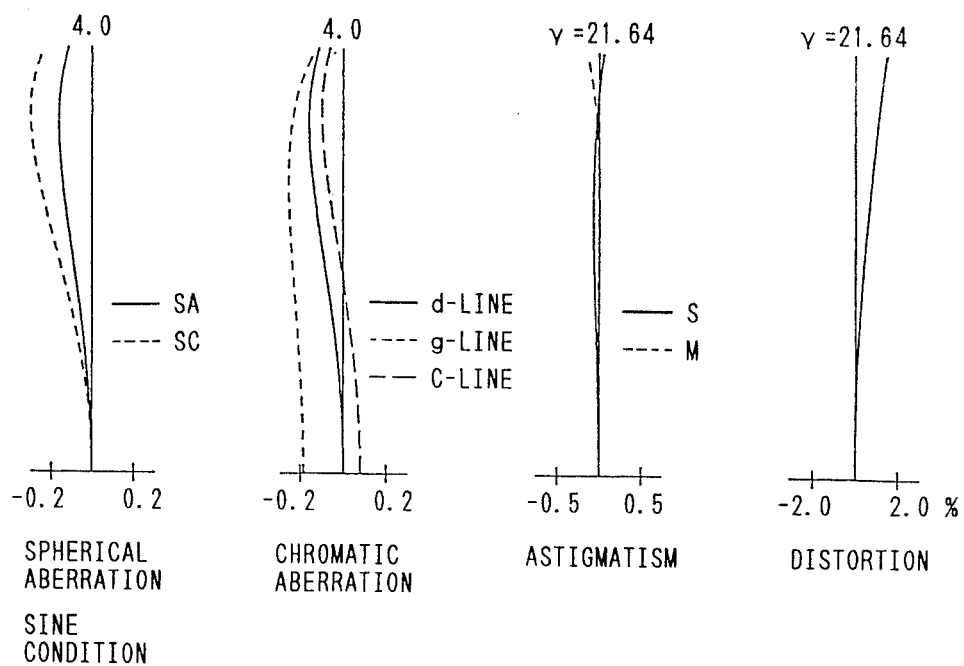
Figure 10B:
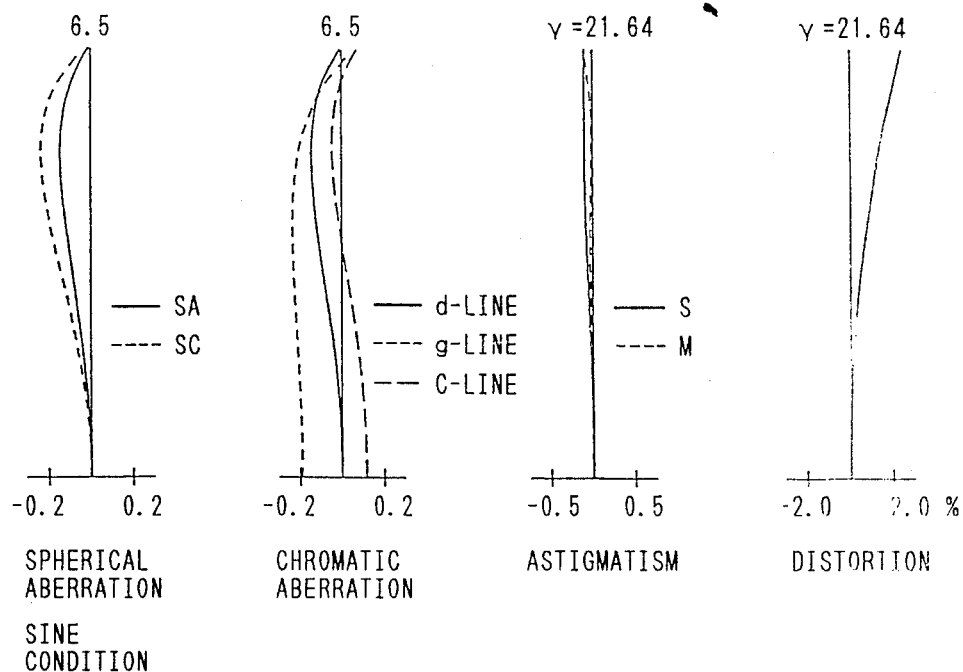
Figure 10C:
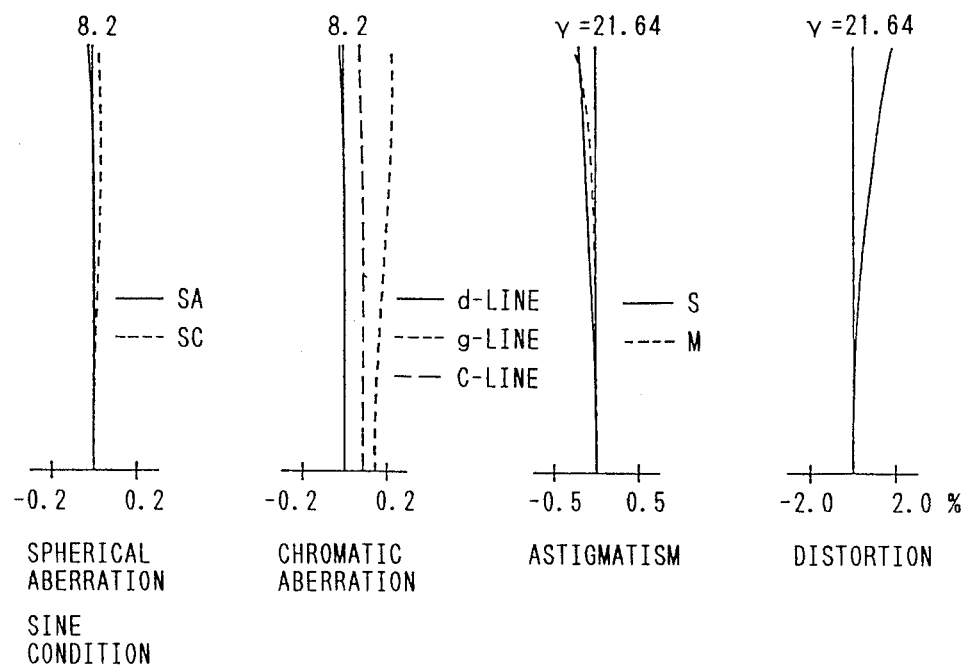
Figure 11:
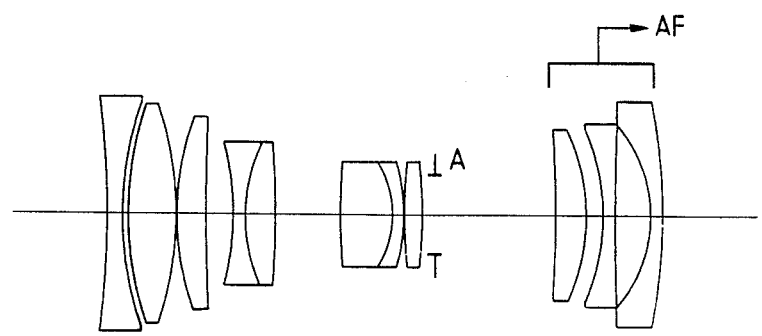
Figure 12A:
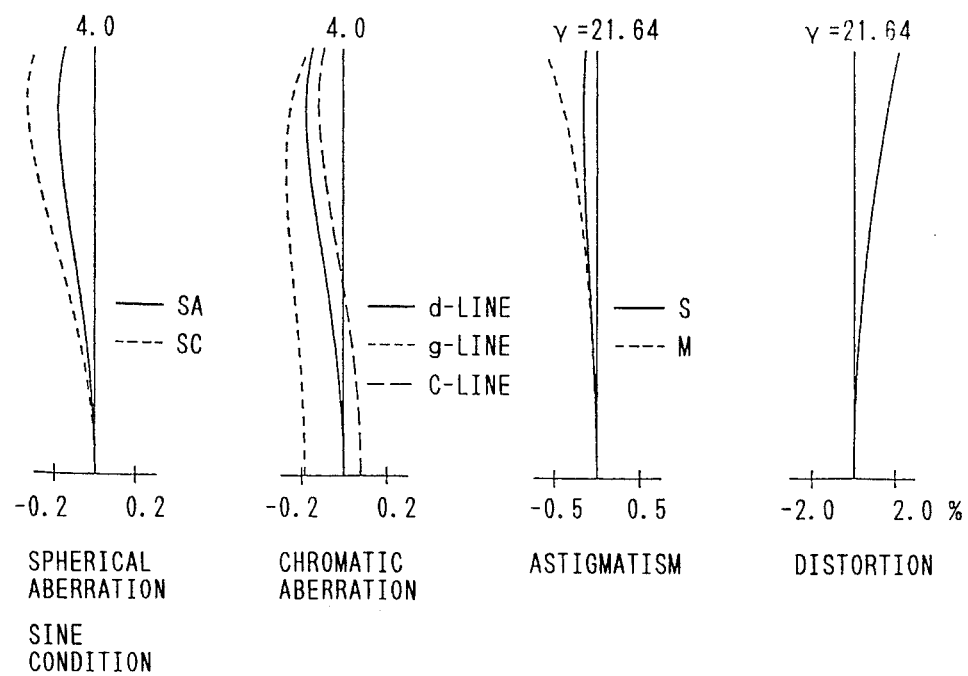
Figure 12B:
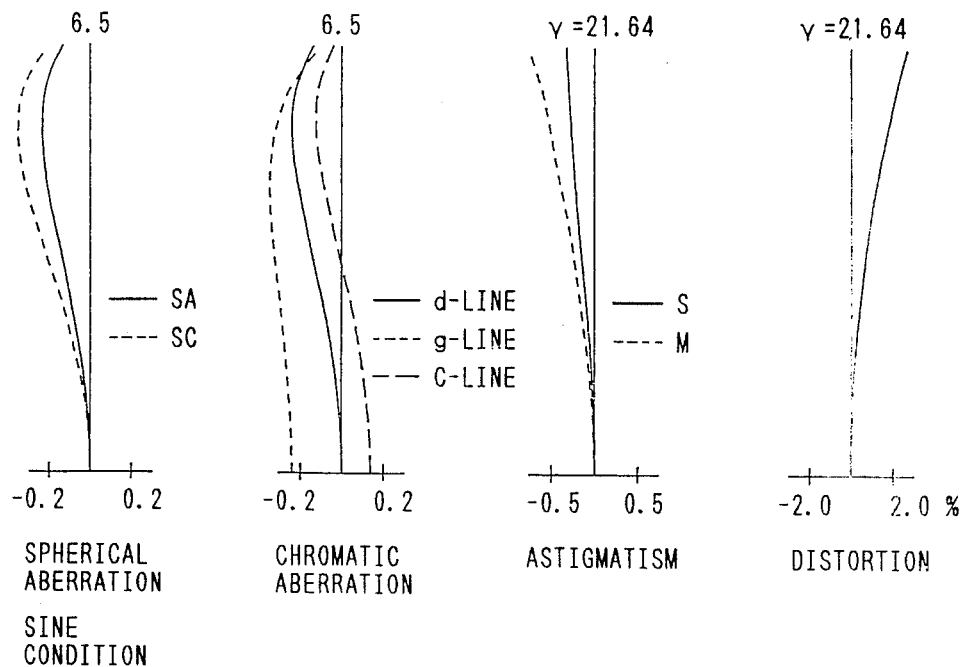
Figure 12C:
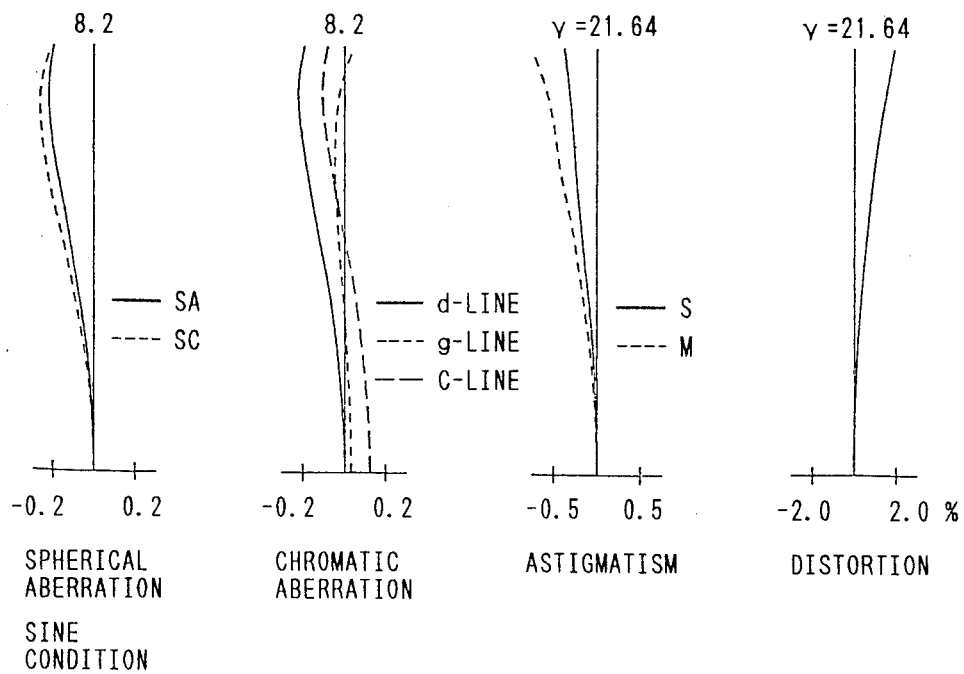
Figure 13:
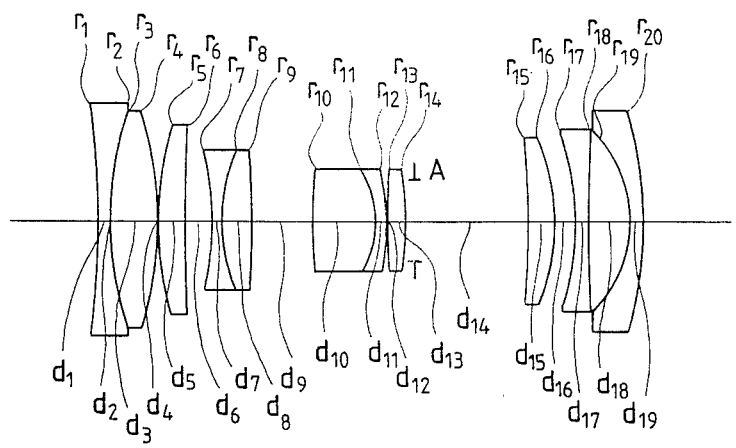
FIGS. 13, 15 and 17 show a lens system at a wide angle side according to Example 3 of the invention, FIG. 13 showing the lens system at the infinite object distance, FIG. 15 showing the lens system at the object distance of 1.3 m by focusing with the second lens group, and FIG. 17 showing the lens system at the object distance of 1.3 m by focusing with the third lens group.
Figure 14A:
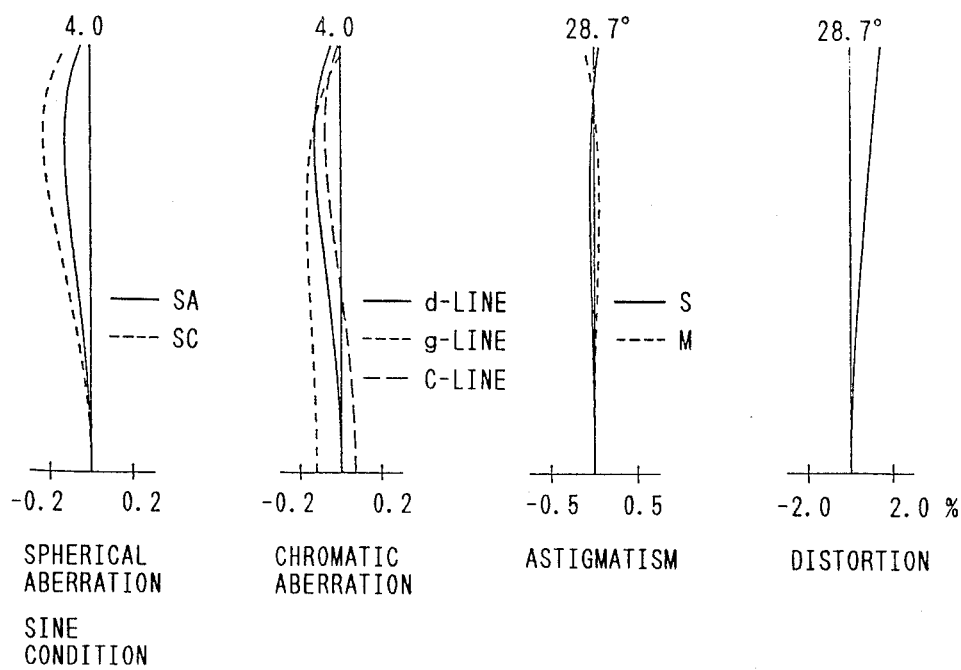
FIGS. 14, 16 and 18 show aberration curves of Example 3 at the infinite distance, the object distance of 1.3 m by focusing with the second lens group, and the object distance of 1.3 m by focusing with the third lens group, respectively, (a), (b) and (c) denoting the conditions at the wide angle side, the intermediate focal length and the telephoto side, respectively.
Figure 14B:
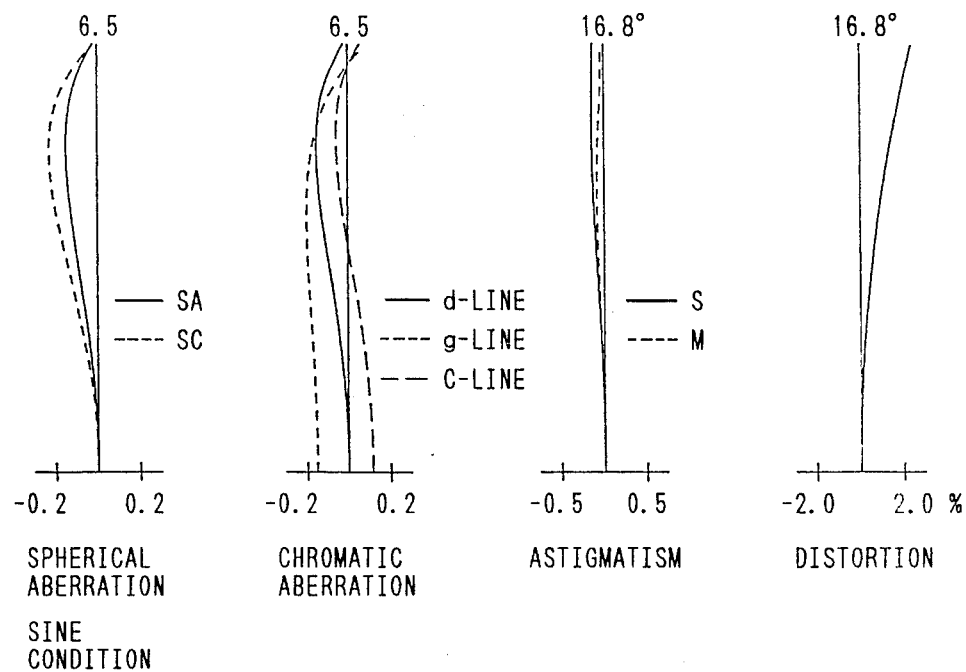
Figure 14C:
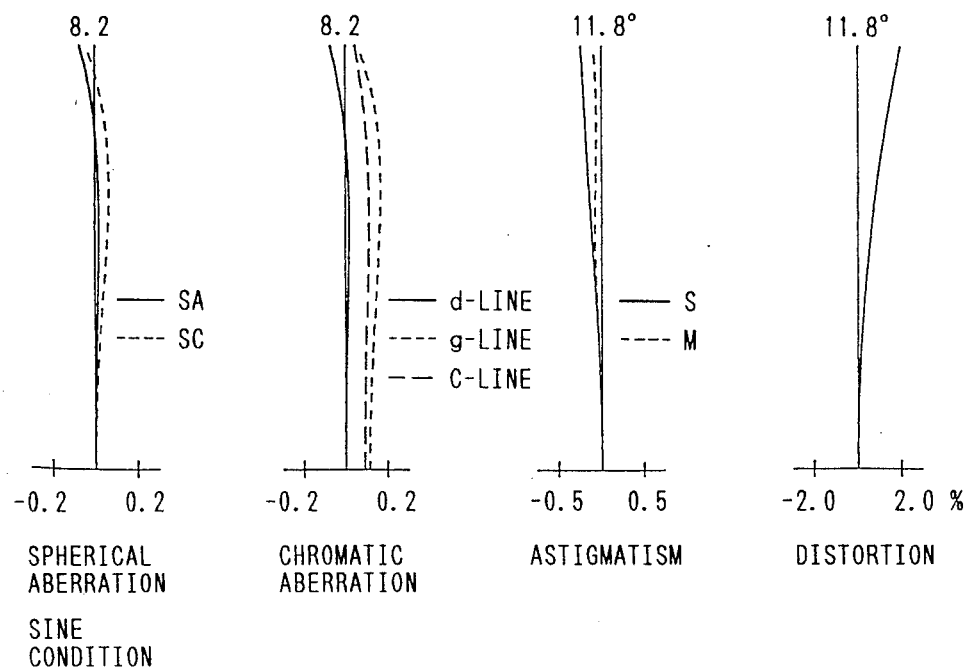
Figure 15:
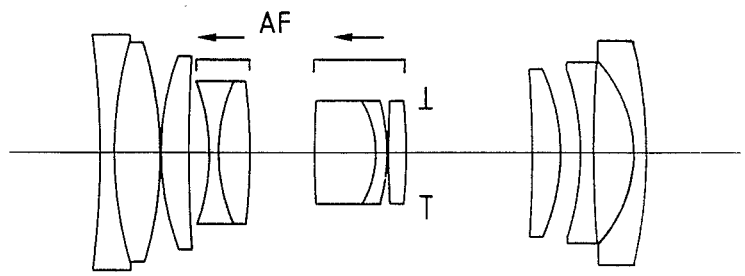
Figure 16A:
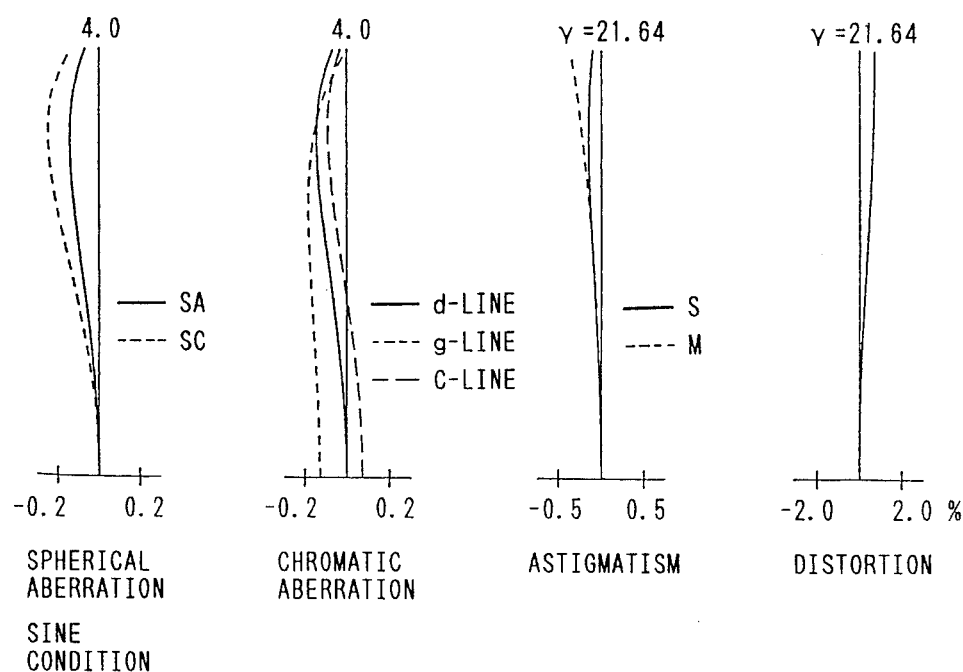
Figure 16B:
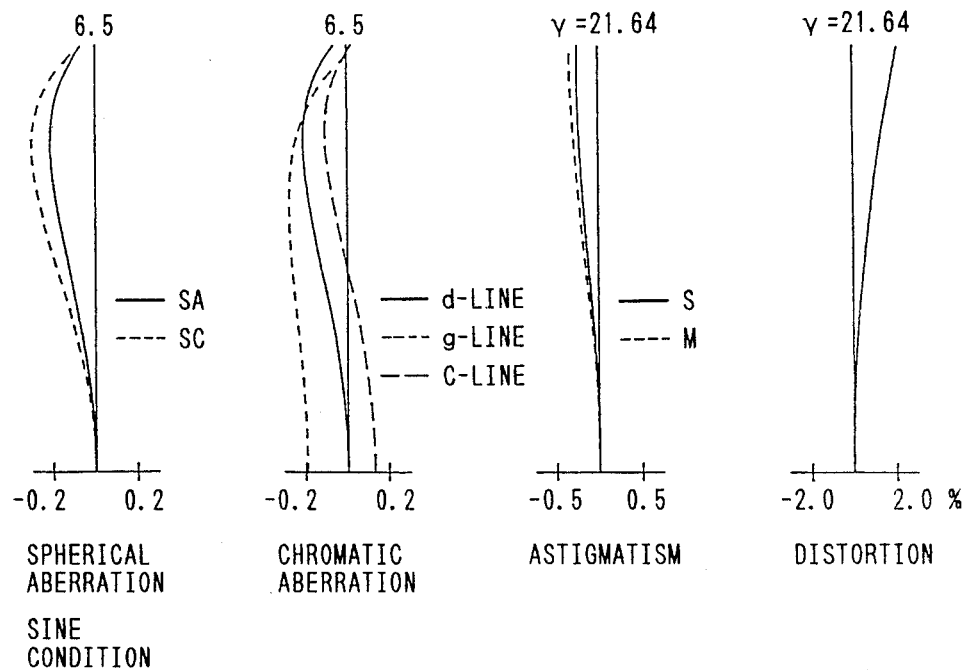
Figure 16C:
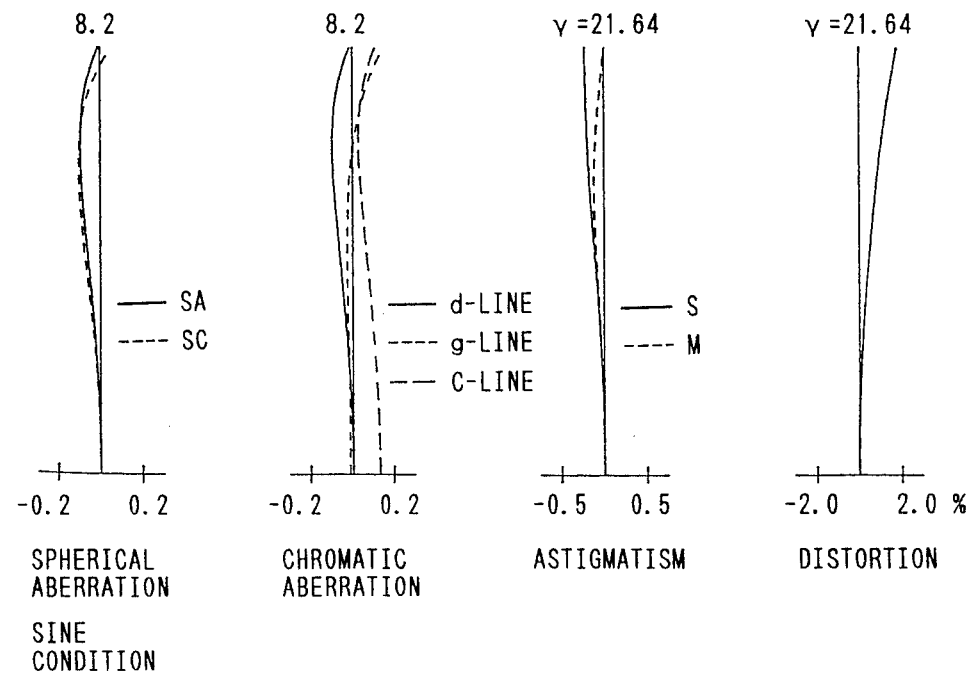
Figure 17:
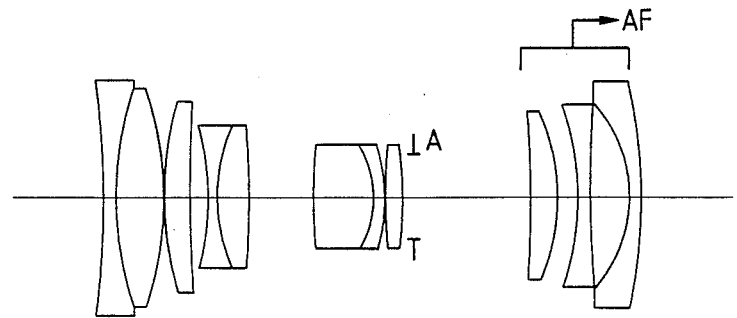
Figure 18A:
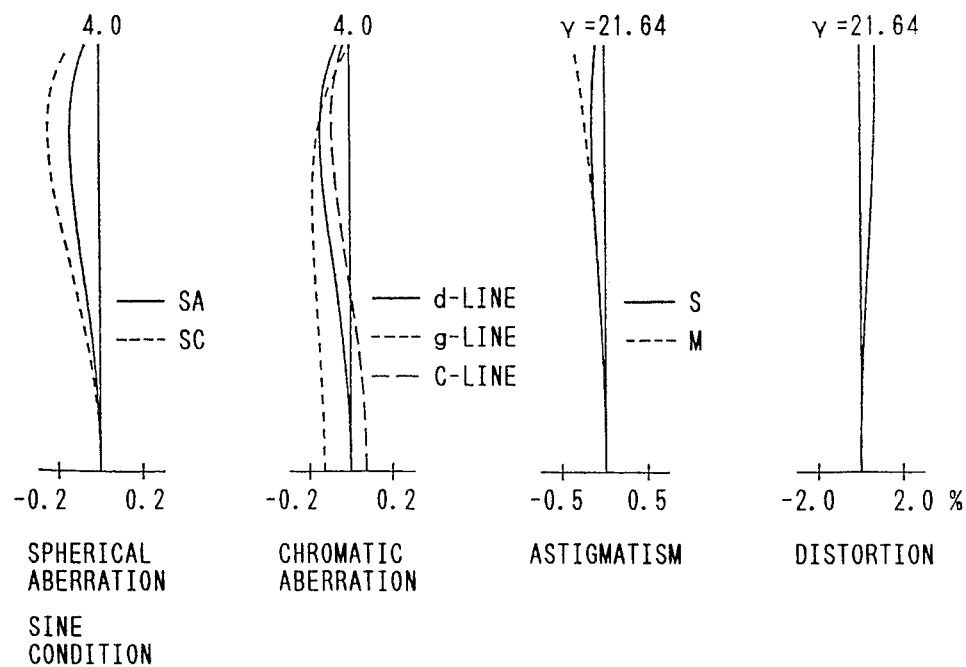
Figure 18B:
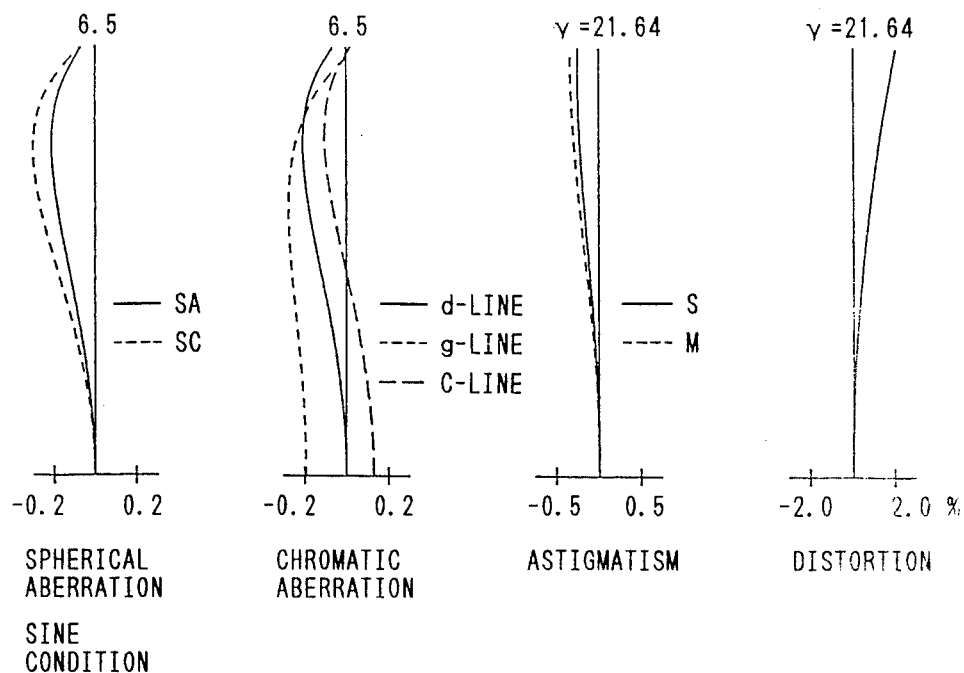
Figure 18C:
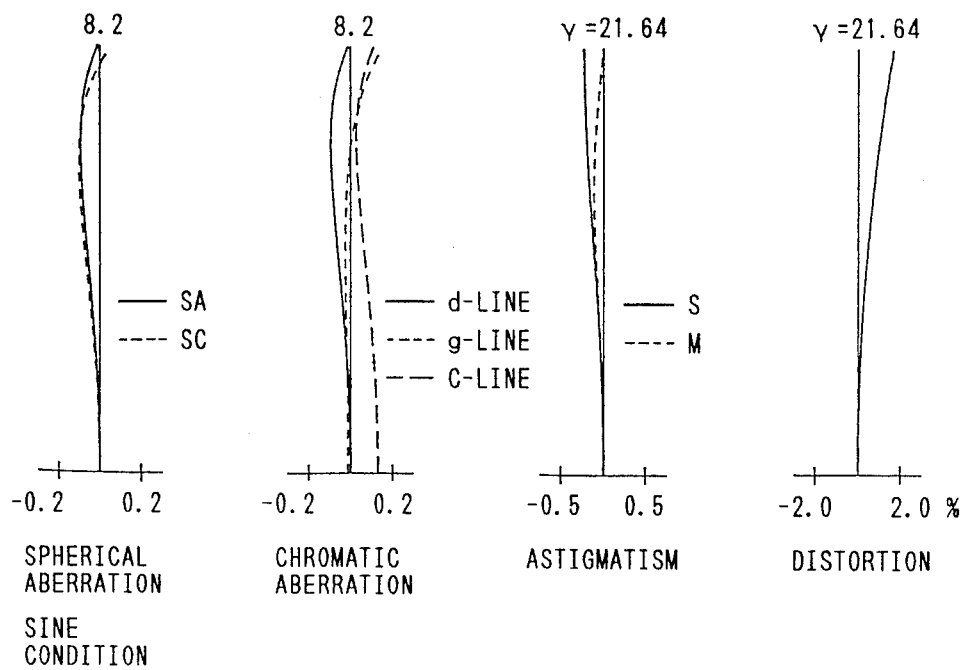
Figure 19:
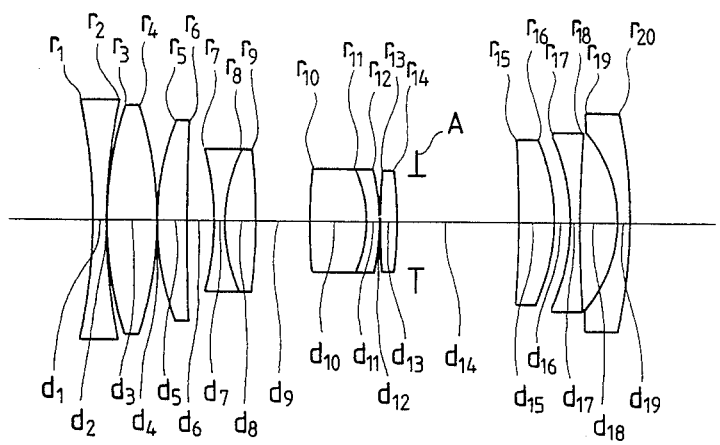
FIGS. 19 and 21 show lens systems at the wide angle side according to Examples 4 and 5 of the invention.
Figure 20A:
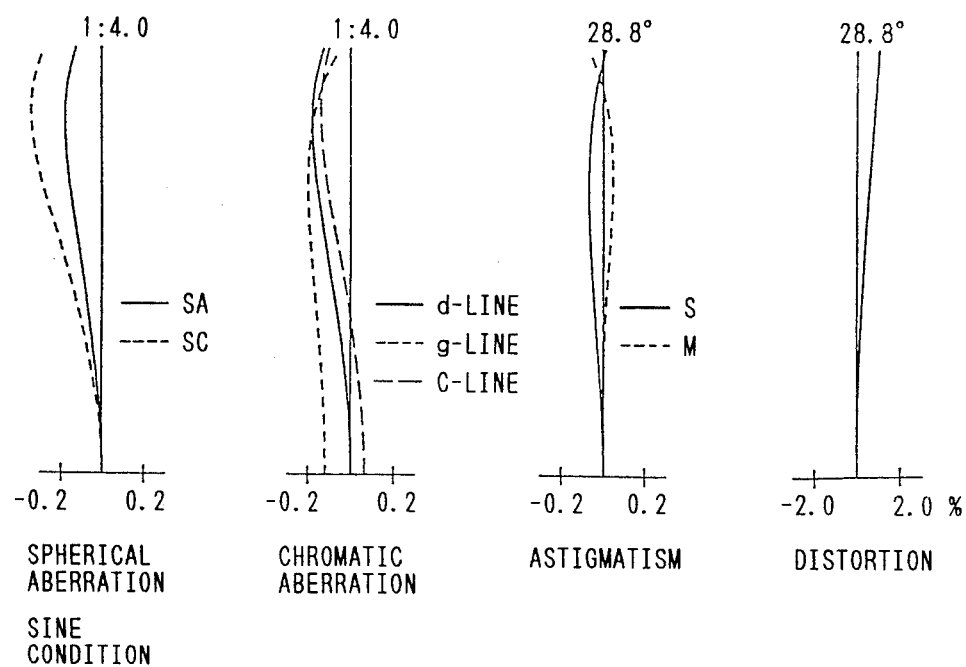
FIGS. 20 and 22 are graphs showing various aberrations according to Examples 4 and 5, (a), (b) and (c) denoting the conditions at the wide angle side, the intermediate focal length and the telephoto side, respectively.
Figure 20B:
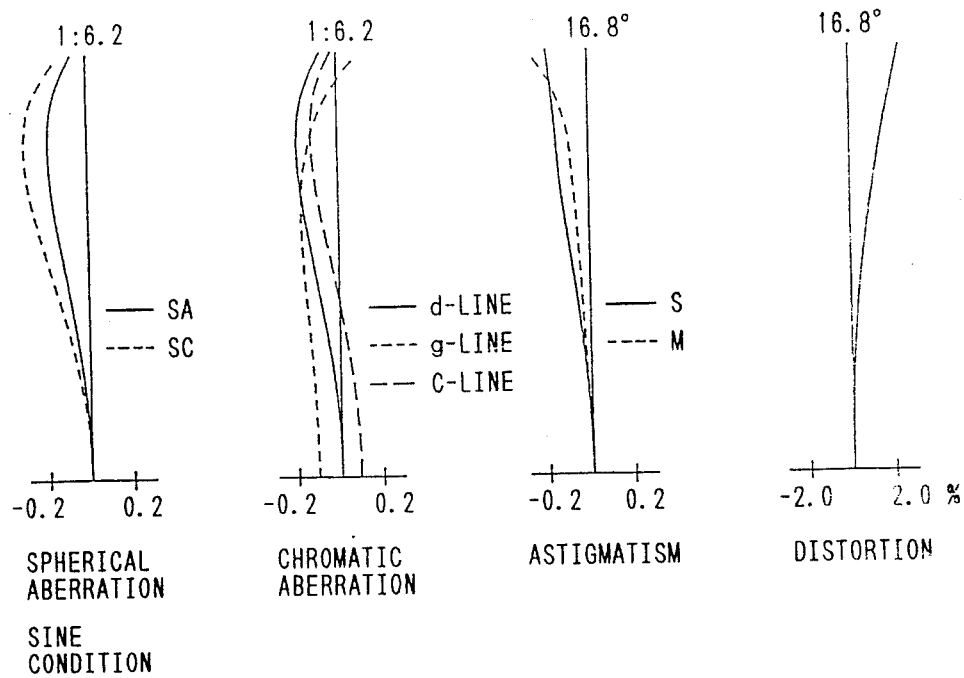
Figure 20C:
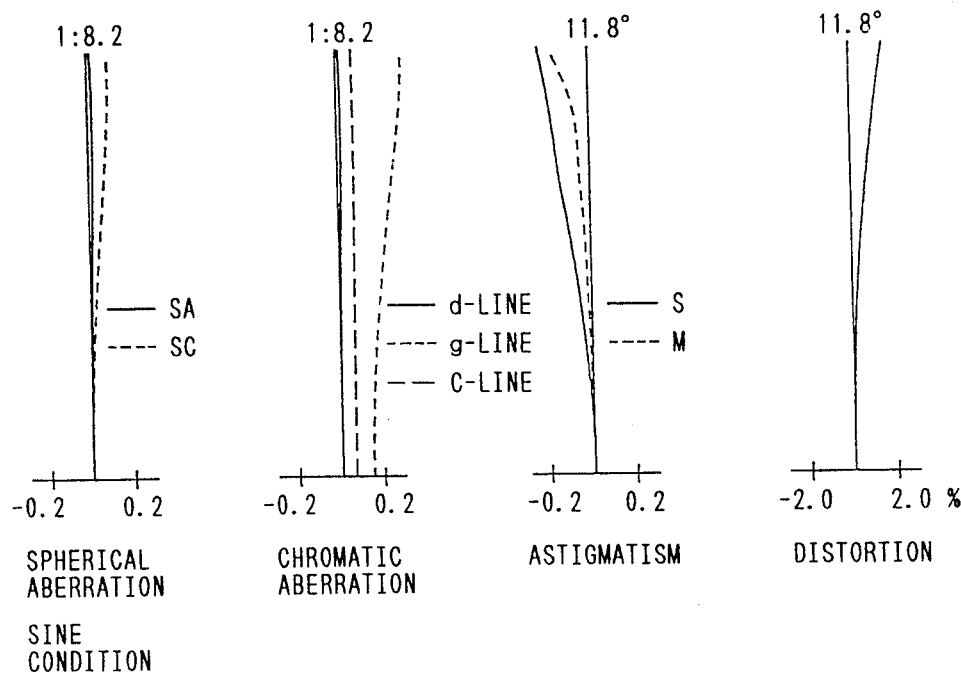
Figure 21:
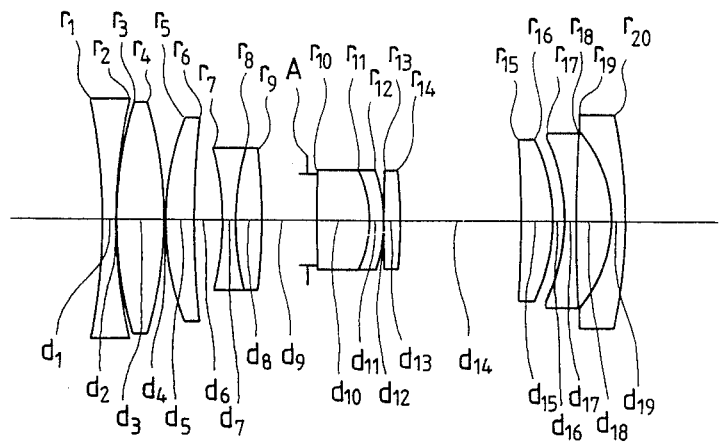
Figure 22A:
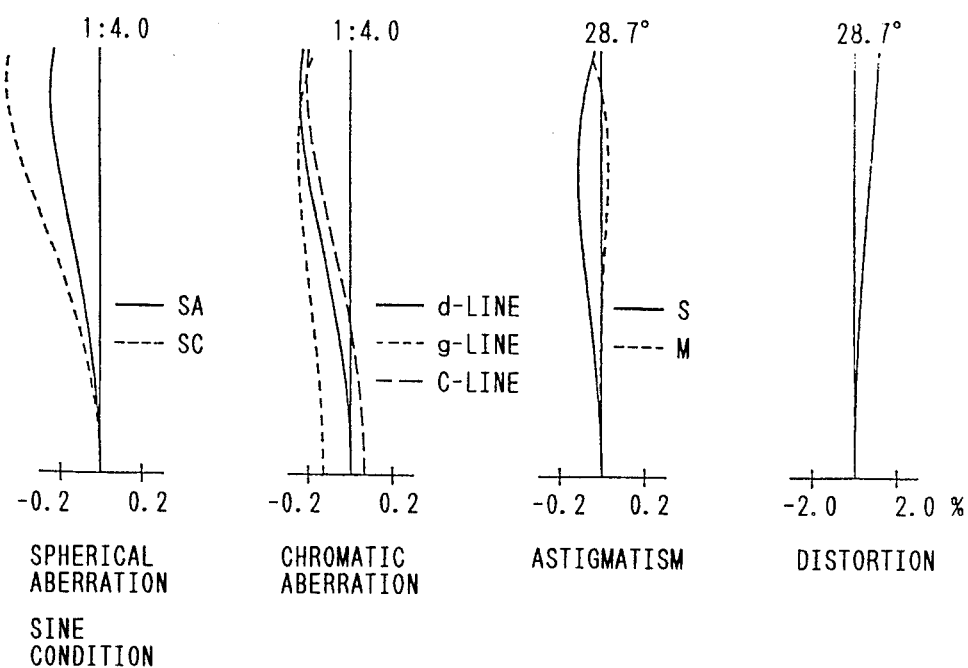
Figure 22B:
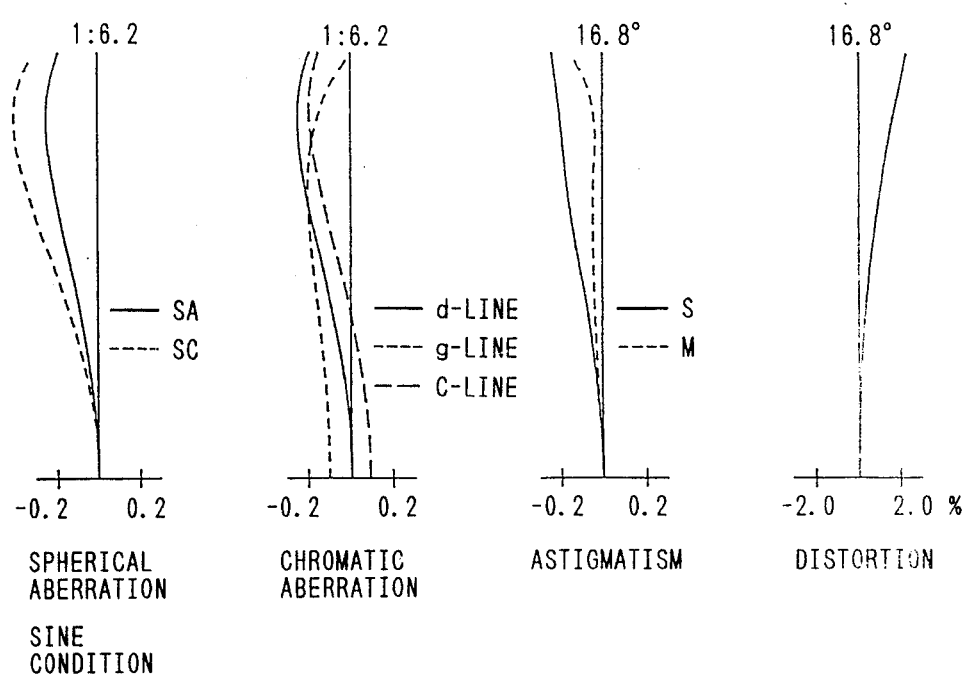
Figure 22C:
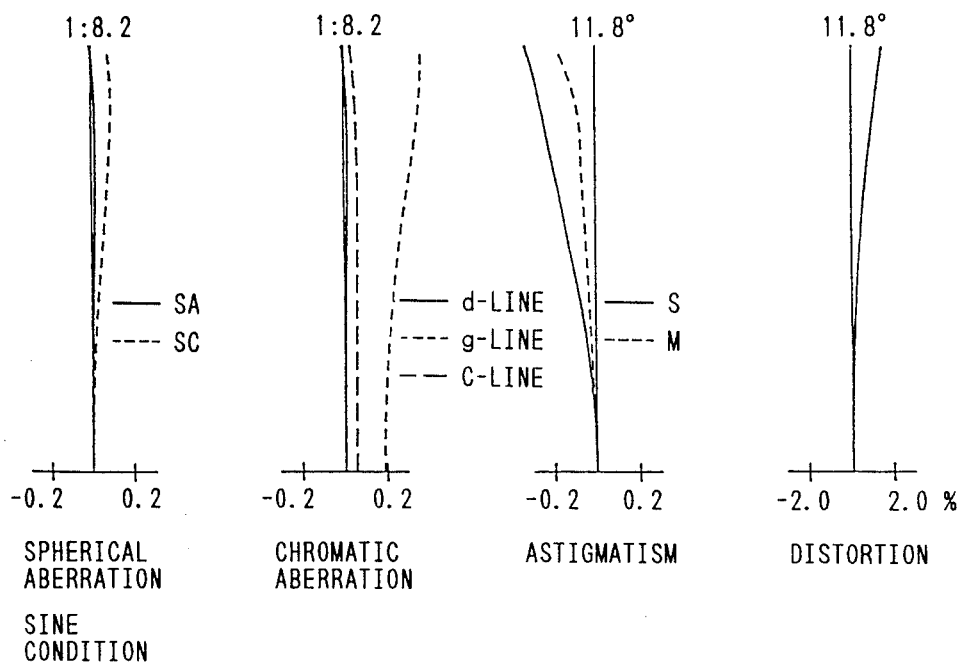

The various conditions of the present invention will now be explained in more detail.

Condition (1) relates to a lateral magnification of the third lens group at the long focal length. If the lower limit is exceeded, the overall length of the lens system and an amount of movement of each lens group are abruptly increased, resulting in enlargement of the overall lens system.

In the system (IV), the zoom ratio is small at about 1.6, the overall lens length and the movement are small even below the lower limit of Condition (1). However, in order to attain the compactness while meeting the requirement to obtain the zoom ratio above 2.5, it is necessary to keep the calculation value over the lower limit of Condition (1).

The four-group system (V) is of the type in which the four lens groups are moved independently of each other. This system is different from that of the present invention in position of the stop diaphragm. It is therefore impossible to directly compare them. However, if it is assumed that the sub-lens groups 2a and 2b of the present invention correspond to the second and third lens groups of the system (V) and the third lens group of the present invention correspond to the fourth lens group of the present invention correspond to the fourth lens group of the system (V), it will be understood that the magnification of the fourth lens group of the system (V) is close to the lower limit of Condition (1), whereas the composite refractive power of the first and second lens groups and the refractive power of the third lens group are very large while the present invention relates to a three-group type that is simpler in arrangement. Also, in comparison with the three-lens group type of the system (V), the present invention is different from that in position of the stop diaphragm and arrangement of refractive powers.

Inversely, if the upper limit of Condition (1) is exceeded, this is advantageous for compactness but a negative power of the third lens group is too increased, resulting in generation of a high order aberration, in particular, an increase of high order spherical aberration oat the telephoto end. Also, a sensitivity related to the focus movement of the second and third lens groups (i.e., the movement of focus when the lens group has an error of 1 mm with reference to a designed position, which will be simply referred to as "focus sensitivity") is abruptly increased. Consequently, in zooming and focusing, the focus displacement is remarkable due to a small positional error of the second and third lens groups. Thus, it is not desirable for a compact camera to exceed the upper limit of Condition (1).

Condition (2) relates to a refractive power of the first lens group. In the same meaning as that of Condition (1), Condition (2) is defined for the purpose of moderate the lens length and movement of each group.

It is possible to regard the lens system of the present invention as a three-group type in which positive lens groups having small refractive powers (in comparison with powers of the master lens group) in front of the second type. If the zoom ratio of the two-group type is increased, the movement of each lens group is abruptly increased. Accordingly, in order to moderate the movement the applicant invented the system (IV). The corresponding value of the system (IV) is lower than the lower limit of Condition (2). The system suffers from a serious problem for increasing the zoom ratio.

If the lower limit of Condition (2) is exceeded, it is impossible to realize a compact system. Inversely if the upper limit thereof is exceeded, this is available for compactness but the refractive power of the first lens group is too increased, resulting in an increase of the spherical aberration concomitant with the zooming operation.

Condition (3) relates to the movement of the first lens group and the sub-lens group 2a. If the lower limit is exceeded, the distance between the positive first and second lens groups is increased. This means that the telephoto ratio is small. Accordingly, this is advantageous in decreasing the movement but the distance between the first and second lens group is largely varied, resulting in increase in change of aberration concomitant with the zooming operation. The corresponding value of the system (IV) which has a small zoom ratio is lower than the lower limit of Condition (3). However, in order to well correct the optical performance with the zoom ratio over 2.5, the values should be more than the lower limit of Condition (3).

Inversely, if the upper limit of Condition (3) is exceeded, the system is similar to the conventional two-group type. This deviates from the effect of the present invention according to which the first lens group is disposed in front of the conventional two-group type to form the third-group type. As a result, the movement of each group is abruptly increased. It is therefore difficult to make compact the system for a camera.

Condition (4) relates to a stop diaphragm which should be interposed between the second and third lens groups.

In order to decrease a diameter of a front lens element, it is preferable to provide the stop diaphragm within the second lens group. However, to divide a shutter mechanism including a stop diaphragm and the second lens group to simplify the mechanism, it is necessary to dispose the stop diaphragm outside the second lens group.

If the lower limit of Condition (4) is exceeded, it is necessary to provide the stop diaphragm within the second lens group, which cannot attain the object of the invention. If the stop diaphragm is disposed behind the second lens group and the value is to be less than the lower limit of Condition (4), the overall length of the second lens group must be set at an extremely short level. The second lens group is composed of the negative sub-group 2a on the object side and the positive sub-group 2b on the image side. If the overall length of the second lens group is shortened, it is difficult to balance the aberration with the sub-groups 2a and 2b so that the variations of coma aberration and curvature of field are increased during focusing and zooming. Accordingly, in order to dispose the stop diaphragm behind the second lens group, the value should be larger than the lower limit of Condition (4).

Inversely, if the upper limit of Condition (4) is exceeded, the stop diaphragm is located too rearwardly, so that a diameter of the front lens element is increased, which is not suitable for a compact camera.

Condition (5) depends upon Conditions (1) and (2) but directly shows a focus sensitivity of the second lens group at the telephoto end. If the lower limit of Condition (5) is exceeded, the focus sensitivity is small and this is available for correcting a manufacture error. However, it is impossible to simultaneously attain the high zoom ratio over 2.5 and the compactness. Inversely if the upper limit is exceeded, this is available for the compactness but the focus sensitivity is too large, so that a large focus movement is generated by a slight positional error of the second lens group, and it is difficult to suppress the focus movement within a requirement of a mechanical precision for a compact camera.

Condition (6) relates to Conditions (1), (2) and (3) but is drawn to the movement of the third lens group. In case of a three-group type, the more the focal length difference and the zoom ratio, the more the movement of the third lens group will become. According to the present invention, to meet Conditions (1), (2) and (3), it is possible to suppress the movement of each lens group. Condition (6) directly restricts the movement of the third lens group. Under the lower limit of the condition, it is impossible to obtain a system having a high zoom ration over 2.5. Inversely over the upper limit, the zooming mechanism will become large in size, which leads to a difficulty of obtaining a compact camera.

In view of the lens arrangement, in order to decrease the overall length of the system and a diameter of the front lens element, it is preferable that the first negative lens of the first lens group be a biconcave lens, and the biconcave negative lens and the subsequent biconvex lens be bonded together, thereby decreasing the degradation of aberration due to the manufacture error.

The sub-group 2a as a whole has an effect to overcompensate the aberration. However, in order to correct the chromatic aberration within the sub-group, at least a negative lens and a positive lens are required. However, if the group is composed only of the positive and negative lenses, since adjacent surfaces of the positive and negative lenses have large curvature, it is preferable to bond these lenses together. Also, since the stop diaphragm is disposed behind the second lens group, a distance from the sub-group 2a to the stop diaphragm is increased. Accordingly, it is impossible to impart a large refractive power to the sub-group 2a in comparison with the sub-group 2b and the third lens group.

If the lower limit of Condition (7) is exceeded, the effect of the negative sub-group 2a is weakened, and the aberration undercompensated by the first lens group is insufficiently corrected. If this aberration is compensated for, the refractive power of the first lens group is small and the lens system is enlarged. Inversely, if the upper limit is exceeded, the variation of the coma aberration and astigmatism is increased only with the simple arrangement of the two negative and positive elements.

The sub-group 2b is a lens group as a whole having a positive refractive power and is characterized by comprising a bonded lens having a divergent surface having a large negative refractive power therein. The reason for this is that a large load is not imposed on the negative sub-group 2a. The sub-group 2b shares a function to overcompensate the aberration. In this case, the divergent surface must has a large negative power, the lenses should be bonded together in view of manufacture property.

The third lens group has the same structure as the rear group of the two-group type. However, the third lens group always has a large negative power illustrated in conjunction with Condition (1).

A zooming method of the present invention is that the distance between the first and second lens groups is increased and the distance between the second and third lens groups is decreased, so that all the lens groups are moved toward the object side. It is preferable that the arrangement allows the sub-groups 2a and 2b to move independently of each other toward the object side (see Example 3). The system thus has a high flexibility, which is advantageous to suppress the amount of each group and which facilitates the compensation of the astigmatism and field curvature. However, as described above, it is necessary to effect an enhancement of precision of the relative positional relation between the sub-groups 2a and 2b.

With respect to focusing, the focusing only with the first lens group having a small refractive power is undesirable as described above. It is preferable to use the second and third lens groups having large refractive powers, for focusing. If the mechanism allows, the sub-groups 2a and 2b are moved toward the object while increasing a distance between the sub-groups 2a and 2b, thereby effectively compensate for the astigmatism and curvature of field for the close-up object (see Example 3).

Of course, if the mechanism allows and the second lens group is moved toward the object and simultaneously therewith the third lens group is moved toward the image (stop being fixed), it is possible to shorten the movement by $\frac{1}{2}$.

In a focusing method using the second and third lens groups, the advancement of the groups is different in accordance with respective focal length even for the same object distance (i.e., so-called varifocal lens). However, if each focal length information may be electrically detected it is possible to determine the advancement by the electrical calculation. This is nominally made in the same manner as in the zoom lens.

For reference, Japanese Kokai's 58-143312 and 61-50112 show a system for an optically compensated zoom lens in an inner focus or an outer focus method. However, Kokai 58-143312 shows a system for an SLR zoom lens. A high zoom ratio is attained but the lens system is large in size and the mechanism is complicated. This is not suitable for a compact camera.

On the other hand, Kokai 61-5011 shows a system for a compact camera. However, conditions set forth in that reference define that the advancement is kept constant at two adjacent points at the short and long focal length ends. The system meeting these conditions has a zoom ratio of about 1.6. If a higher zoom ratio is attained, errors in advancement are not neglibible in an intermediate focal length range. This is not a zoom lens. Accordingly, in a zoom lens for a compact camera with a high zoom ratio, it is necessary to miniaturize the system. It is difficult to attain this by the inner focus and rear focus method. The system must rely upon the electrical detection and calculation.

Condition (8) relates to a ratio of the focus sensitivity of the first and third lens groups which are moved in unison with each other during zooming. If the upper limit is exceeded, the positive/negative characteristics ar the same. This is not effective to suppress the focus sensitivity. If the lower limit is exceeded, the focus sensitivity is small but the positive refractive power of the first lens group is excessively large, resulting in increase of variation of the aberration such as spherical aberration during the zooming operation.

Also, Condition (9) relates to the focus sensitivity in the case where the first and third lens groups are moved in unison with each other. If the upper limit is exceeded, the focus sensitivity is small but it is necessary to decrease the refractive negative power of the third lens group. As a result, the movement of the third lens group is abruptly increased during the zooming operation. This is not effective to miniaturize the system. If the lower limit is exceeded, this is effective to miniaturize the system but the focus sensitivity of the third lens group is too large. As a result, the effect to suppress the focus sensitivity with the first lens group is weak. Even if the first and third lens groups are moved in unison with each other, the focus movement is not neglibible relative to the manufacture error.

Incidentally, Japanese Kokai 63-157120 is related to a four-group zoom lens but is directed to a system in which the first and third lens groups are moved in unison with each other. However, in comparison with Japanese Kokai 63-157120, as in apparent from a power of each lens group and a lens arrangement thereof, the third lens group of that Kokai corresponds to the subgroup 2b of the present invention, and the fourth lens group corresponds to the third lens group. Accordingly, since, in the reference, the first and third lens groups that are quite different in power from those of the present invention are moved in unison with each other, the focus sensitivity of the first lens group is about +2.3 to 2.9 as a result of numerical calculation, and is substantially the same as that of the present invention, but the focus sensitivity of the third lens group thereof is about +3.8 to 4.2 in the same positive/negative characteristics and is rather increasing the focus sensitivity by the integral movement.

With respect to the stop diaphragm, it is possible to arrange it within the second lens group. As described before, it is advantageous to dispose the stop diaphragm between the second and third lens groups in a manufacture aspect and a mechanical aspect. However, if the stop diaphragm is disposed within the second lens group, it is possible to miniaturize a diameter of the front lens element and to increase the marginal light at a high stop value. If the mechanism allows, it is easy to perform and optical design by providing the stop diaphragm in the second lens group.

In the lens arrangement, in order to decrease the overall length and the diameter of the front lens element, it is preferable to use the negative lens (first negative lens) in the first lens group on the object side as a biconcave negative lens. Also, in comparison with a zoom system in which the first, second and third lens groups are all moved independently of each other, the system in which the first and third lens groups are moved in unison with each other suffers from a problem that the marginal light would be reduced in the intermediate range. In order to solve this problem, it is necessary to increase slightly diameters of two positive lenses (second and third positive lenses) in the first lens group. Accordingly, in order to suppress the increase thereof, it is necessary to increase slightly the refractive power of the first lens group. Therefore, in the case where the first negative lens and the second positive lens are not bonded together, it is more effective to compensate for the aberration.

With respect to focusing, the focusing only with the first lens group having a small refractive power is improper since the marginal light would be reduced. It is preferable to use the focusing system using the second and third lens groups that have large refractive powers. Of course, if the mechanism allows, and the second and third lens groups are moved in the opposite direction, it is possible to reduce the movements of the lens groups. It is possible to move the first lens group together with the other groups by a short distance. There is no merit of the movement of the first lens group that is large in size.

EXAMPLES

Examples 1–5 of the present invention are described in the tables below in which $F_{NO}$ signifies the F number, f represents focal length, $\omega$ represents the half viewing angle, $f_B$ represents the back focus, r represents the radius of curvature of an individual lens surface, d represents the lens thickness or the aerial distance between lens surfaces, N represents the refractive index of an individual lens at the d-line, and $\nu$ represents the Abbe number of an individual lens.

EXAMPLE 1

$F_{NO} = 1:4.0 \sim 6.5 \sim 8.2$  $f = 39.02 \sim 70.01 \sim 102.02$
$\omega = 28.7° \sim 16.8° \sim 11.8°$  $f_B = 8.73 \sim 30.48 \sim 49.6$

| Surface No. | r | d | n | $\nu$ |
|---|---|---|---|---|
| 1 | −69.545 | 1.50 | 1.83400 | 37.2 |
| 2 | 45.086 | 0.00 | | |
| 3 | 45.086 | 5.36 | 1.58913 | 61.2 |
| 4 | −38.751 | 0.10 | | |
| 5 | 29.731 | 3.28 | 1.51633 | 64.1 |
| 6 | 366.188 | 3.20~8.78~13.93 | | |
| 7 | −24.887 | 1.20 | 1.83481 | 42.7 |
| 8 | 20.863 | 3.15 | 1.80518 | 25.4 |
| 9 | −83.189 | 6.54 | | |
| 10 | 70.905 | 6.37 | 1.51821 | 65.0 |
| 11 | −11.989 | 1.35 | 1.80518 | 25.4 |
| 12 | −22.083 | 0.10 | | |
| 13 | 156.086 | 2.00 | 1.58913 | 61.2 |
| 14 | −35.469 | 13.84~5.92~2.00 | | |
| 15 | −152.335 | 2.99 | 1.80518 | 25.4 |
| 16 | −26.975 | 2.69 | | |
| 17 | −25.935 | 1.30 | 1.83400 | 37.2 |
| 18 | 243.658 | 3.85 | | |
| 19 | −16.323 | 1.40 | 1.77250 | 49.6 |
| 20 | −62.877 | | | |

(lens space variations for object at 1.3 m)

| focusing method | | f | 39 | 70 | 102 |
|---|---|---|---|---|---|
| 2nd lens group | | $d_6$ | 2.42 | 7.83 | 12.77 |
| | | $d_{14}$ | 14.62 | 6.87 | 3.16 |
| 3rd lens group | | $d_6$ | 3.20 | 8.78 | 13.93 |
| | | $d_{14}$ | 15.22 | 6.85 | 2.99 |

Stop position  1.0 behind 14th surface (1) $\dfrac{f_T}{f_{1\sim 2T}} = 3.132$ (2) $\dfrac{f_T}{f_1} = 1.620$ (3) $\dfrac{x_{2a}}{x_1} = 0.730$ (4) $\dfrac{l_{2\sim A}}{f_\omega} = 0.556$ (5) $\left(\dfrac{f_T}{f_{1\sim 2T}}\right)^2 - \left(\dfrac{f_T}{f_1}\right)^2 = 7.19$ (6) $\dfrac{x_3}{(f_T - f_W)Z} = 0.248$ (7) $\dfrac{f_2}{-f_{2a}} = 0.832$

EXAMPLE 2

$F_{NO} = 1:4.0 \sim 6.5 \sim 8.2$  $f = 39.00 \sim 69.98 \sim 102.04$
$\omega = 28.7° \sim 16.8° \sim 11.8°$  $f_B = 8.90 \sim 29.74 \sim 49.44$

| Surface No. | r | d | n | $\nu$ |
|---|---|---|---|---|
| 1 | −81.208 | 1.50 | 1.83400 | 37.2 |
| 2 | 36.830 | 0.50 | | |
| 3 | 33.534 | 5.52 | 1.51633 | 64.1 |
| 4 | −38.625 | 0.10 | | |
| 5 | 30.331 | 3.18 | 1.62041 | 60.3 |
| 6 | 250.834 | 3.20~8.93~12.82 | | |
| 7 | −25.364 | 1.20 | 1.83481 | 42.7 |
| 8 | 20.031 | 3.24 | 1.80518 | 25.4 |
| 9 | −79.760 | 7.16 | | |
| 10 | 69.379 | 5.67 | 1.51821 | 65.0 |
| 11 | −11.998 | 1.35 | 1.80518 | 25.4 |

-continued

| $F_{NO} = 1:4.0\sim6.5\sim8.2$  $f = 39.00\sim69.98\sim102.04$ | | | |
|---|---|---|---|
| $\omega = 28.7°\sim16.8°\sim11.8°$  $f_B = 8.90\sim29.74\sim49.44$ | | | |
| 12 | −22.095 | 0.10 | | |
| 13 | 145.924 | 2.00 | 1.58913 | 61.2 |
| 14 | −36.500 | 13.82~6.56~3.07 | | |
| 15 | −101.608 | 3.04 | 1.80518 | 25.4 |
| 16 | −23.884 | 1.99 | | |
| 17 | −24.348 | 1.30 | 1.83400 | 37.2 |
| 18 | 341.863 | 3.84 | | |
| 19 | −15.639 | 1.40 | 1.77250 | 49.6 |
| 20 | −62.435 | | | |

| (lens space variations for object at 1.3 m) | | | | |
|---|---|---|---|---|
| focusing method | f | 39 | 70 | 102 |
| 2nd lens group | $d_6$ | 2.48 | 8.03 | 11.76 |
| | $d_{14}$ | 14.54 | 7.46 | 4.13 |
| 3rd lens group | $d_6$ | 3.20 | 8.93 | 12.82 |
| | $d_{14}$ | 14.98 | 7.41 | 3.95 |

Stop position  1.0 behind 14th surface (1) $\dfrac{f_T}{f_{1\sim 2T}} = 3.297$ (2) $\dfrac{f_T}{f_1} = 1.723$ (3) $\dfrac{x_{2a}}{x_1} = 0.756$ (4) $\dfrac{l_{2\sim A}}{f_\omega} = 0.557$ (5) $\left(\dfrac{f_T}{f_{1\sim 2T}}\right)^2 - \left(\dfrac{f_T}{f_1}\right)^2 = 7.90$ (6) $\dfrac{x_3}{(f_T - f_W)Z} = 0.246$ (7) $\dfrac{f_2}{-f_{2a}} = 0.776$

EXAMPLE 3

| $F_{NO} = 1:4.0\sim6.5\sim8.2$  $f = 39.00\sim70.00\sim102.00$ | | | |
|---|---|---|---|
| $\omega = 28.7°\sim16.8°\sim11.8°$  $f_B = 8.80\sim29.73\sim48.20$ | | | |
| Surface | | | | |
| 1 | −107.000 | 1.50 | 1.83400 | 37.2 |
| 2 | 38.413 | 0.00 | | |
| 3 | 38.413 | 5.23 | 1.51633 | 64.1 |
| 4 | −40.606 | 0.10 | | |
| 5 | 29.795 | 3.04 | 1.62041 | 60.3 |
| 6 | 135.495 | 3.20~9.41~14.71 | | |
| 7 | −26.035 | 1.20 | 1.83481 | 42.7 |
| 8 | 20.155 | 3.29 | 1.80518 | 25.4 |
| 9 | −89.454 | 6.84~5.96~4.97 | | |
| 10 | 60.814 | 6.70 | 1.51821 | 65.0 |
| 11 | −11.768 | 1.35 | 1.80518 | 25.4 |
| 12 | −22.113 | 0.10 | | |
| 13 | 140.662 | 2.00 | 1.58913 | 61.2 |
| 14 | −36.015 | 13.13~5.68~2.03 | | |
| 15 | −135.273 | 2.99 | 1.80518 | 25.4 |
| 16 | −25.386 | 2.49 | | |
| 17 | −25.912 | 1.30 | 1.83400 | 37.2 |
| 18 | 179.516 | 4.34 | | |
| 19 | −14.965 | 1.40 | 1.77250 | 49.6 |
| 20 | −49.329 | | | |

| (lens space variations for object at 1.3 m) | | | | |
|---|---|---|---|---|
| focusing method | f | 39 | 70 | 102 |
| 2nd lens group | $d_6$ | 2.19 | 8.12 | 13.08 |
| | $d_9$ | 7.11 | 6.30 | 5.39 |
| | $d_{14}$ | 13.88 | 6.64 | 3.24 |
| 3rd lens group | $d_6$ | 3.20 | 9.41 | 14.71 |
| | $d_9$ | 6.84 | 5.96 | 4.97 |

-continued

| $F_{NO} = 1:4.0\sim6.5\sim8.2$  $f = 39.00\sim70.00\sim102.00$ | | | |
|---|---|---|---|
| $\omega = 28.7°\sim16.8°\sim11.8°$  $f_B = 8.80\sim29.73\sim48.20$ | | | |
| $d_{14}$ | 14.42 | 6.60 | 3.02 |

Stop position  1.0 behind 14th surface (1) $\dfrac{f_T}{f_{1\sim 2T}} = 3.127$ (2) $\dfrac{f_T}{f_1} = 1.511$ (3) $\dfrac{x_{2a}}{x_1} = 0.697$ (4) $\dfrac{l_{2\sim A}}{f_\omega} = 0.576$ (5) $\left(\dfrac{f_T}{f_{1\sim 2T}}\right)^2 - \left(\dfrac{f_T}{f_1}\right)^2 = 7.50$ (6) $\dfrac{x_3}{(f_T - f_W)Z} = 0.239$ (7) $\dfrac{f_2}{-f_{2a}} = 0.770$

EXAMPLE 4

| $F_{NO} = 1:4.0\sim6.2\sim8.2$  $f = 39.00\sim70.00\sim102.00$ | | | |
|---|---|---|---|
| $\omega = 28.8°\sim16.8°\sim11.8°$  $f_B = 8.80\sim29.00\sim49.28$ | | | |
| Surface No. | r | d | n | ν |
| 1 | −70.000 | 1.500 | 1.83400 | 37.2 |
| 2 | 48.131 | 0.338 | | |
| 3 | 43.517 | 5.338 | 1.58913 | 61.2 |
| 4 | −43.517 | 0.100 | | |
| 5 | 31.486 | 3.153 | 1.58913 | 61.2 |
| 6 | 164.560 | 3.500~10.984~14.458 | | |
| 7 | −25.613 | 1.200 | 1.83481 | 42.7 |
| 8 | 21.482 | 3.109 | 1.80518 | 25.4 |
| 9 | −83.963 | 6.198 | | |
| 10 | 50.639 | 6.700 | 1.51633 | 64.1 |
| 11 | −11.927 | 1.350 | 1.80518 | 25.4 |
| 12 | −22.599 | 0.100 | | |
| 13 | 175.675 | 2.000 | 1.58913 | 61.2 |
| 14 | −35.086 | 13.260~5.776~2.302 | | |
| 15 | −134.181 | 3.981 | 1.80518 | 25.4 |
| 16 | −23.348 | 1.701 | | |
| 17 | −23.820 | 1.300 | 1.83400 | 37.2 |
| 18 | 275.596 | 3.972 | | |
| 19 | −15.441 | 1.400 | 1.77250 | 49.6 |
| 20 | −60.088 | | | |

$m_2 = 0.483$
$m_3 = 3.225$
$m_2 m_3 = 1.558$ $\dfrac{(m_2 m_3)^2}{(1 - m_3^2)} = -0.258$ $(m_2 m_3)^2 + (1 - m_3^2) = -6.97$

EXAMPLE 5

| $F_{NO} = 1:4.0\sim6.2\sim8.2$  $f = 39.00\sim70.00\sim102.00$ | | | |
|---|---|---|---|
| $\omega = 28.7°\sim16.8°\sim11.8°$  $f_B = 8.80\sim28.91\sim49.28$ | | | |
| Surface No. | r | d | n | ν |
| 1 | −70.000 | 1.500 | 1.83400 | 37.2 |

-continued $F_{NO} = 1:4.0 \sim 6.2 \sim 8.2$  $f = 39.00 \sim 70.00 \sim 102.00$
$\omega = 28.7° \sim 16.8° \sim 11.8°$  $f_B = 8.80 \sim 28.91 \sim 49.28$

| 2 | 50.898 | 0.281 | | |
| 3 | 44.561 | 5.288 | 1.58913 | 61.2 |
| 4 | −44.561 | 0.100 | | |
| 5 | 29.521 | 3.205 | 1.58913 | 61.2 |
| 6 | 127.709 | 3.500 ~ 10.902 ~ 14.350 | | |
| 7 | −25.233 | 1.200 | 1.83481 | 42.7 |
| 8 | 23.994 | 2.988 | 1.80518 | 25.4 |
| 9 | −77.614 | 5.961 | | |
| 10 | 48.984 | 6.246 | 1.51633 | 64.1 |
| 11 | −11.922 | 1.350 | 1.80518 | 25.4 |
| 12 | −21.814 | 0.100 | | |
| 13 | 175.896 | 2.000 | 1.58913 | 61.2 |
| 14 | −38.142 | 13.149 ~ 5.747 ~ 2.299 | | |
| 15 | −119.653 | 3.293 | 1.80518 | 25.4 |
| 16 | −22.544 | 1.392 | | |
| 17 | −23.591 | 1.300 | 1.83400 | 37.2 |
| 18 | 288.718 | 3.947 | | |
| 19 | −15.154 | 1.400 | 1.77250 | 49.6 |
| 20 | −56.923 | | | |

$m_2 = 0.493$
$m_3 = 3.246$
$m_2 m_3 = 1.600$ $$\frac{(m_2 m_3)^2}{(1 - m_3^2)} = -0.269$$

$$(m_2 m_3)^2 + (1 - m_3^2) = -6.94$$

As described above, according to the present invention, since the stop diaphragm and each lens group are separated from each other, it is possible to simplify the zooming and focusing mechanisms. Also, since the focusing is attained by the second or third lens group, the automatically focusing mechanism is lightweight and simple and is high speed.

Furthermore, to meet the foregoing conditions, it is possible to provide a compact zoom lens having a high performance and a high zoom ratio.

I claim:

1. A high zoom ratio zoom lens for a compact camera, comprising, in order from the object side, a first lens group having a positive focal length, a second lens group having a positive focal length, and a third lens group having a negative focal length,
   wherein, when zooming is carried out from a wide angle side to a telephoto side, the first, second and third lens groups are all moved toward the object side so that a distance between the first and second lens groups in increased and a distance between the second and third lens groups is decreased,
   said zoom lens satisfying the following conditions:
   (A) said second lens group being composed, in order from the object side, of a sub-component 2a having a negative focal length and a sub-component 2b having a positive focal length,
   (B) a stop diaphragm being disposed between said second and third lens groups and being moved in unison with said second lens group during zooming, and
   (C) said stop diaphragm being separatable from said second lens group and being positionally fixed during focusing.

2. The zoom lens according to claim 1, further satisfying the conditions:

$$2.5 < \frac{f_T}{f_{1-2T}} < 4.0 \quad (1)$$

$$1.2 < f_T/f_1 < 2.3 \quad (2)$$

$$0.43 < x_{2a}/x_1 < 0.9 \quad (3)$$

$$0.3 < l_{2-A}/f_W < 0.8 \quad (4)$$

where
$f_T$ is the focal length of the overall zoom lens at the telephoto side;
$f_{1-2T}$ is the composite focal length of the first and second lens groups at the telephoto side;
$f_1$ is the focal length of the first lens groups;
$(f_T)/(f_{1-2T}) = m_3$ is the lateral magnification of the third lens group at the telephoto side;
$f_T/f_1 = m_{2,3}$ is the composite lateral magnification of the second and third lens groups at the telephoto side;
$x_1$ is the amount of movement of the first lens group during zooming;
$x_{2a}$ is the amount of movement of the sub-component 2a during zooming;
$f_W$ is the focal length of the overall zoom lens at the wide angle side; and
$l_{2-A}$ is the distance form a front most end of said second lens group to said stop diaphragm.

3. The zoom lens according to claims 2, further satisfies the conditions:

$$3.0 < \left(\frac{f_T}{f_{1-2T}}\right)^2 - \left(\frac{f_T}{f_1}\right)^2 < 14.0 \quad (5)$$

$$0.1 < \frac{x_3}{(f_T - f_W)Z} < 0.4 \quad (6)$$

where
$x_3$ is the amount of movement of the third lens group during zooming; and
Z is the zoom ratio.

4. The zoom lens according to claim 1, wherein said first lens group is composed, in order from the object side, of a biconcave lens, a biconvex lens and a positive lens whose convex surface is directed toward the object.

5. The zoom lens according to claim 4, wherein said biconcave lens and said biconvex lens of said first lens group are bonded together.

6. The zoom lens according to claim 1, wherein said sub-component 2a is composed, in order from the object side, a biconcave lens and a positive lens that are bonded together with a bonded convex surface being directed to the object, said zoom lens satisfying the condition:

$$0.5 < \frac{f_2}{-f_{2a}} < 1.0 \quad (7)$$

where
$f_{2a}$ is the focal length of the sub-component 2a; and
$f_2$ is the focal length of the second lens group at the wide angle side.

7. The zoom lens according to claim 1, wherein said sub-component 2b is composed, in order from the object side, of a bonded lens of a positive lens and a negative meniscus lens with a bonded concave surface being directed to said object, and a positive lens.

8. The zoom lens according to claim 1, wherein said third lens group is composed, in order from the object side, of a positive lens having a larger curvature surface convex toward the image, and two negative lenses each having a concave surface toward the object.

9. The zoom lens according to claim 1, wherein when zooming is carried out from the wide angle side to the telephoto side, the sub-components 2a and 2b are moved independently of each other toward the object while decreasing a distance between said sub-components 2a and 2b.

10. The zoom lens according to claim 1, wherein during focusing, said first lens group, said stop diaphragm and said third lens groups are fixed, and only said second lens group is moved toward the object.

11. The zoom lens according to claim 10, wherein during focusing, the distance between the sub-components 2a and 2b is increased and said sub-components are moved independently of each other toward the object.

12. The zoom lens according to claim 1, wherein during focusing, said first lens group, said second lens group and said stop diaphragm are fixed, and only said third lens group is moved toward the image.

13. A high zoom ratio zoom lens for a compact camera, comprising, in order from the object side, a first lens group having a positive focal length, a second lens group having a positive focal length, and a third lens group having a negative focal length, wherein, when zooming is carried out from a wide angle side to a telephoto side, the first, second and third lens groups are all moved toward the object side so that a distance between the first and second lens groups is increased and a distance between the second and third lens gorups is decreased, said zoom lens satisfying the following conditions:

(A) said second lens group being composed, in order from the object side, of a sub-component 2a having a negative focal length and a sub-component 2b having a positive focal length, (B) a stop diaphragm being moved in unison with said second lens group during zooming, and (C) said first lens group and said third lens group being moved in unison with each other during zooming.

14. The zoom lens according to claim 13, further satisfying the following condition:

(D) positive/negative signs of focusing sensitivities of said first and third lens groups that are moved together being opposite to each other, where the focusing sensitivity is an amount of movement of focus in an optical axis direction relative to an error of movement of each lens group.

15. The zoom lens according to claim 14, wherein said stop diaphragm is interposed between said second lens group and said third lens group and is moved is unison with said second lens group during zooming.

16. The zoom lens according to claim 14, wherein said stop diaphragm is interposed between said sub-components 2a and 2b and is moved in unison with said second lens gruop during zooming.

17. The zoom lens according to claim 14, wherein during focusing, said first lens group, said stop diaphragm and said third lens groups are fixed, and only said second lens group is moved toward the object.

18. The zoom lens according to claim 17, wherein during focusing, said stop diaphragm and said second lens group are moved in unison with each other toward the object.

19. The zoom lens according to claim 14, wherein during focusing, said first lens group, said second lens group and said stop diaphragm are fixed, and only said third lens group is moved toward the image.

20. The zoom lens according to claim 14, wherein said first lens group is composed, in order from the object side, of a biconcave lens, a biconvex lens and a positive lens whose convex surface is directed toward the object.

21. The zoom lens according to claim 14, wherein said sub-component 2a is composed, in order from the object side, a biconcave lens and a positive lens that are bonded together with a bonded convex surface being directed to the object.

22. The zoom lens according to claim 14, wherein said sub-component 2b is composed, in order from the object side, of a bonded lens of a positive lens and a negative meniscus lens with a bonded concave surface being directed to said object, and a positive lens.

23. The zoom lens according to claim 14, wherein said third lens group is composed, in order from the object side, of a positive lens having a larger curvature surface convex toward the image, and two negative lenses each having a concave surface toward the object.

24. The zoom lens according to claim 14, further satisfying the following conditions:

$$-0.5 < \frac{(m_2 m_3)^2}{(1 - m_3^2)} < 0 \qquad (8)$$

$$-10.0 < (m_2 m_3)^2 + (1 - m_3^2) < -3.0 \qquad (9)$$

where $m_2$ is the lateral magnification of the second lens group at the telephoto side, $m_3$ is the lateral magnification of the third lens group at the telephoto side, $(m_2 m_3)^2$ is the focusing sensitivity of the first lens group at the telephoto side, and $(1 - m_3^2)$ is the focusing sensitivity of the third lens group at the telephoto side.

* * * * *